(12) United States Patent
Li et al.

(10) Patent No.: US 11,568,176 B1
(45) Date of Patent: Jan. 31, 2023

(54) DEEP FEATURE EXTRACTION AND TRAINING TOOLS AND ASSOCIATED METHODS

(71) Applicant: Amazon Technologies, Inc., Seattle, WA (US)

(72) Inventors: Kun Li, Sammamish, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/358,316

(22) Filed: Jun. 25, 2021

(51) Int. Cl.
*G06K 9/62* (2022.01)
*G06V 30/194* (2022.01)

(52) U.S. Cl.
CPC ......... *G06K 9/6261* (2013.01); *G06V 30/194* (2022.01)

(58) Field of Classification Search
CPC ... G06K 9/6261; G06K 9/6215; G06V 30/194
See application file for complete search history.

(56) References Cited

U.S. PATENT DOCUMENTS

| 2013/0182964 | A1* | 7/2013 | Thomas | H04N 19/30 382/232 |
| 2018/0189615 | A1* | 7/2018 | Kang | G06K 9/6218 |
| 2019/0354802 | A1* | 11/2019 | Lin | G06K 9/627 |
| 2020/0160528 | A1* | 5/2020 | Rhodes | G06V 20/49 |
| 2021/0256423 | A1* | 8/2021 | Zhou | G06N 3/082 |
| 2022/0147743 | A1* | 5/2022 | Roy | G06K 9/6215 |

* cited by examiner

*Primary Examiner* — Myron Wyche
(74) *Attorney, Agent, or Firm* — Athorus, PLLC

(57) ABSTRACT

Deep feature extraction and training tools and processes may facilitate extraction and understanding of deep features utilized by deep learning models. For example, imaging data may be tessellated and masked to generate a plurality of masked images. The masked images may be processed by a deep learning model to generate a plurality of masked outputs. The masked outputs may be aggregated for each cell of the tessellated image and compared to an original output for the imaging data from the deep learning model. Individual cells and associated image regions having masked outputs that correspond to the original output may comprise deep features utilized by the deep learning model.

18 Claims, 12 Drawing Sheets

DEEP FEATURE EXTRACTION AND TRAINING TOOLS AND ASSOCIATED METHODS

BACKGROUND

Various deep learning models, such as deep neural networks, may be used for various computer vision applications. Such deep learning models may automatically extract and learn deep features over time. Although such deep learning models may perform various computer vision applications effectively, the deep learning models may operate substantially as black (or opaque) box systems. As a result, it may be difficult or impossible to understand how the deep learning models are actually making decisions, and may also be difficult or impossible to modify or refine such deep learning models as desired. Accordingly, there is a need for tools and associated methods to extract, understand, refine, train, and modify deep features utilized by deep learning models.

DETAILED DESCRIPTION

Figure 1B:
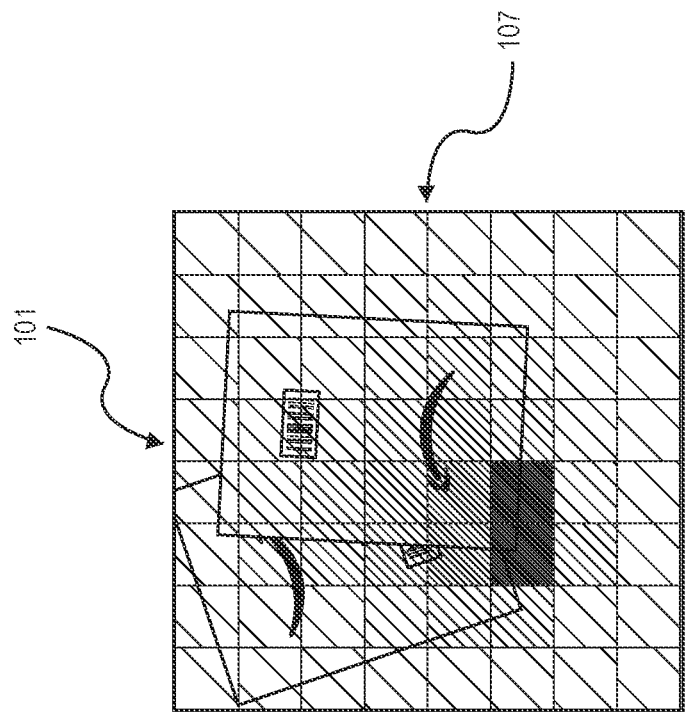
FIG. 1B is a schematic diagram of an example heatmap overlaid onto the imaging data, in accordance with implementations of the present disclosure.

As is set forth in greater detail below, implementations of the present disclosure are directed to deep feature extraction and training tools and associated methods to extract, understand, refine, train, and modify deep features utilized by deep learning models.

Generally, deep learning models, such as deep neural networks or similar deep learning algorithms or techniques, may automatically extract deep features based on input or training data. Such automatically extracted deep features may be more robust than hand-crafted or manually created features utilized by other types of machine learning models, algorithms, or techniques. However, deep learning models and the automatic extraction of deep features may be more computationally expensive than other types of machine learning models. In addition, deep features may be difficult or impossible to identify or understand because deep learning models may substantially operate as black boxes, in which generally only the inputs and outputs are visible or understandable. As a result, it may be difficult to understand why or how some deep learning models may provide good or correct outputs or decisions, whereas other deep learning models may provide bad or incorrect outputs or decisions, even when provided with the same input data.

The deep feature extraction and training tools and associated methods described herein may provide insight or understanding into particular deep features utilized by deep learning models, e.g., in the context of image recognition, computer vision, or related applications of deep learning models. For example, a deep learning model may process original imaging data and provide an original output, e.g., a determination or decision related to objects or representations within the imaging data, based on deep features utilized by the deep learning model.

In order to gain an understanding of deep features utilized by the deep learning model, the deep feature extraction tool may tessellate the original imaging data into a plurality of cells, and then mask various subsets of the cells. Then, the deep learning model may process the various subsets of cells and provide associated masked outputs, and the deep feature extraction tool may compare the masked outputs with the original output. The masked outputs for the various subsets of cells that match the original output may indicate portions of the imaging data that constitute or correspond to the deep features utilized by the deep learning model to generate the original output. Further, a heatmap of various masked outputs for the plurality of cells relative to the original output may be generated to visualize the portions of the imaging data that constitute or correspond to the deep features.

Using the deep feature extraction tool, portions of imaging data that constitute or correspond to deep features utilized by deep learning models to make determinations or decisions related to the imaging data may be extracted and understood. In this manner, deep features that may result in good or correct decisions with respect to the imaging data may be understood and reinforced. Further, deep features that may result in bad or incorrect decisions with respect to the imaging data may also be understood and modified.

Based on the extraction and understanding of deep features utilized by deep learning models, various further actions may be performed. For example, based on the extracted deep features, deep learning models may be trained, refined, or modified to utilize, prioritize, or focus on those deep features that may lead to correct decisions and/or to discard, remove, or ignore other deep features that may lead to incorrect decisions. In addition, based on the extracted deep features, one or more deep learning models may be selected from a plurality of deep learning models for particular use cases, applications, and/or environments in which the one or more deep learning models may be understood to perform better than others.

Further, the deep feature extraction tool may be used to extract and understand deep features utilized by deep learning models over time, in order to understand why or how deep features may have changed or shifted over time based on various input or training data. In addition, changes to applications or environments represented in imaging data may be tested using the deep feature extraction tool in order to understand the potential impact on correct or incorrect decisions by deep learning models due to the changes represented in imaging data. Moreover, based on the extracted deep features, changes to processes, operations, or behaviors related to the applications or environments represented in imaging data may be made or incorporated that may lead to more correct decisions and fewer incorrect decisions.

Furthermore, particular image regions that constitute or correspond to the deep features utilized by one or more deep learning models may be selected, sampled, or stored to train one or more other deep learning models. Moreover, for new imaging data, particular image regions that may be similar to those that constitute or correspond to deep features utilized by deep learning models may be selected, sampled, or isolated for processing by the deep learning models, while other image regions may be deselected, removed, or ignored, thereby reducing or minimizing the computational load associated with processing new imaging data by the deep learning models.

Accordingly, the deep feature extraction and training tools and methods described herein may be used to extract, understand, refine, train, and modify deep features utilized by deep learning models. Based on an understanding of deep features utilized by deep learning models, various improvements, refinements, or modifications may be made to the deep learning models and deep features themselves, to the selection and use of particular deep learning models, and/or to the applications or environments in which such deep learning models may be implemented.

Figure 1A:
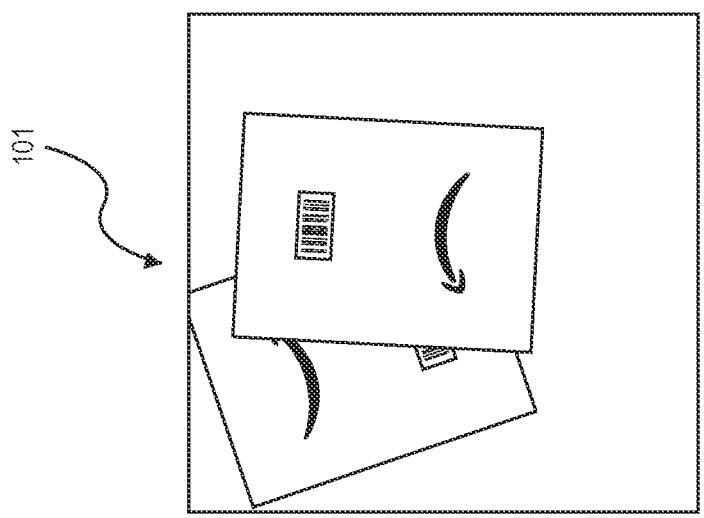
FIG. 1A is a schematic diagram of example imaging data, in accordance with implementations of the present disclosure.

FIG. 1A is a schematic diagram of example imaging data, in accordance with implementations of the present disclosure.

Imaging data captured by one or more cameras, imaging sensors, or other types of imaging devices may include representations of one or more objects, items, vehicles, people, clothing, buildings, signs, locations, portions of an environment, or various other types of objects. As shown in the example of FIG. 1A, the example imaging data 101 may include representations of one or more packages, envelopes, items, or other types of objects. In particular, the example imaging data 101 of FIG. 1A may include representations of two packages that may be at least partially stacked or overlapping each other.

In various example embodiments, various deep learning models may be trained and implemented to determine one or more possible outputs based on the imaging data that is provided as input. For example, as shown in FIG. 1A, the deep learning models may be trained and implemented to receive imaging data as input, and detect or determine whether and how many packages are represented within the imaging data. The one or more possible outputs may comprise determinations that no packages are present, a single package is present, or multiple packages are present within the imaging data.

In other example embodiments, various deep learning models may be trained and implemented to receive imaging data as input, and detect or determine whether and how many people are represented within the imaging data. For example, the one or more possible outputs may comprise determinations that no people are present, one person is present, or multiple people are present within the imaging data. In additional example embodiments, the various deep learning models may also detect or determine whether any detected people are separated from each other with sufficient distance within the imaging data. Then, the one or more possible outputs may comprise determinations that no people are present, one or more people are present with sufficient distance between them, or multiple people are present with insufficient distance between them within the imaging data.

In various other example embodiments, various deep learning models may be trained and implemented to receive imaging data as input, and detect or determine whether and how many items, objects, packages, vehicles, animals, people, buildings, or other types of objects are represented within the imaging data. For example, the deep learning models may be trained and implemented to determine one or more possible outputs based on the imaging data that is provided as input. Various numbers of possible outputs, e.g., two or more possible outputs, may be associated with different deep learning models that receive and process imaging data associated with different applications or environments. Further, the various deep learning models may also detect or determine various characteristics or attributes associated with any detected items, objects, packages, vehicles, animals, people, buildings, or other types of objects within the imaging data, such as size, shape, dimensions, number, color, appearance, other visual features, position, orientation, direction, speed, acceleration, or various other characteristics or attributes. In addition, the one or more possible outputs of deep learning models may also include associated confidence values.

Returning to the example imaging data 101 of FIG. 1A, a deep learning model may receive and process the imaging data 101 of an original image, and output an original determination or decision that the imaging data 101 of the original image includes representations of multiple packages. This may be a good or correct decision with respect to the example imaging data 101 of the original image. Although the deep learning model may make a correct decision with respect to the example imaging data 101 of the original image, it may be difficult or impossible to understand why or how the deep learning model made the correct determination, as only the inputs and outputs of the deep learning model are generally visible or available for review or analysis. Thus, the deep feature extraction and training tool and associated methods described herein may facilitate extraction and understanding of deep features and corresponding image regions of imaging data that may lead to correct or incorrect decisions by deep learning models.

FIG. 1B is a schematic diagram of an example heatmap overlaid onto the imaging data, in accordance with implementations of the present disclosure.

The deep feature extraction and training tool and associated methods described herein may generate and overlay a heatmap 107 onto the imaging data 101 to visualize one or more deep features associated with image regions of imaging data 101, as shown in FIGS. 1A and 1B. As further described herein, the imaging data 101 may be tessellated into a plurality of cells. Various subsets of the cells may be masked, e.g., by removing imaging data from some of the cells. Then, the various subsets of cells may be provided as inputs to a deep learning model. The deep learning model may process the various subsets of cells and generate various masked outputs associated with respective subsets of cells. In the context of FIGS. 1A and 1B, the one or more possible outputs may comprise determinations that no packages are present, a single package is present, or multiple packages are present within the imaging data.

The various masked outputs may be associated with and accumulated for each cell included in the respective subsets of cells. In particular, the various masked outputs that correspond to the original output based on the imaging data 101, e.g., the original determination or decision that the imaging data includes representations of multiple packages, may be associated with and accumulated for each cell included in the respective subsets of cells.

The heatmap 107 may be generated based on the number of times that the masked outputs for each cell correspond to the original output. In the example of FIGS. 1A and 1B, each cell of the heatmap 107 is shaded or hatched based on the number of times that the masked outputs for each cell correspond to the original output. For example, lightly shaded or widely hatched cells, such as cells generally around a periphery of the imaging data 101, may indicate that a small or low number of masked outputs for such cells corresponds to the original output. In contrast, darkly shaded or tightly hatched cells, such as cells generally slightly below and toward a left side of a center of the imaging data 101, may indicate that a large or high number of masked outputs for such cells corresponds to the original output.

As a result, cells that may be darkly shaded or tightly hatched may constitute or correspond to deep features utilized by the deep learning model to determine the original output. Accordingly, image regions of the imaging data 101 that are associated with the darkly shaded cells may correspond to the deep features. Likewise, cells that may be lightly shaded or widely hatched may not constitute or correspond to deep features utilized by the deep learning model to determine the original output. In addition, image regions of the imaging data 101 that are associated with the lightly shaded cells may not correspond to the deep features.

In some example embodiments, such as the example shown in FIGS. 1A and 1B, the deep features may correspond to cells and image regions that result in an original output that is a correct decision. For such examples, the deep feature extraction and training tool may extract and facilitate understanding of the deep features that lead to correct decisions, such that the deep learning models may be further refined, trained, or modified as desired.

In other example embodiments, the deep features may correspond to cells and image regions that result in an original output that is an incorrect decision. For such examples, the deep feature extraction and training tool may extract and facilitate understanding of the deep features that lead to incorrect decisions, such that the deep learning models may also be further refined, trained, or modified as desired.

In example embodiments, the heatmap 107 may be generated based on a count, summation, or aggregation of the number of times that various masked outputs for each cell match or correspond to the original output. In further example embodiments, the heatmap 107 may be generated using various proportions, percentages, fractions, averages, or other mathematic or arithmetic functions based on the various masked outputs for each cell relative to the original output.

Figure 2:
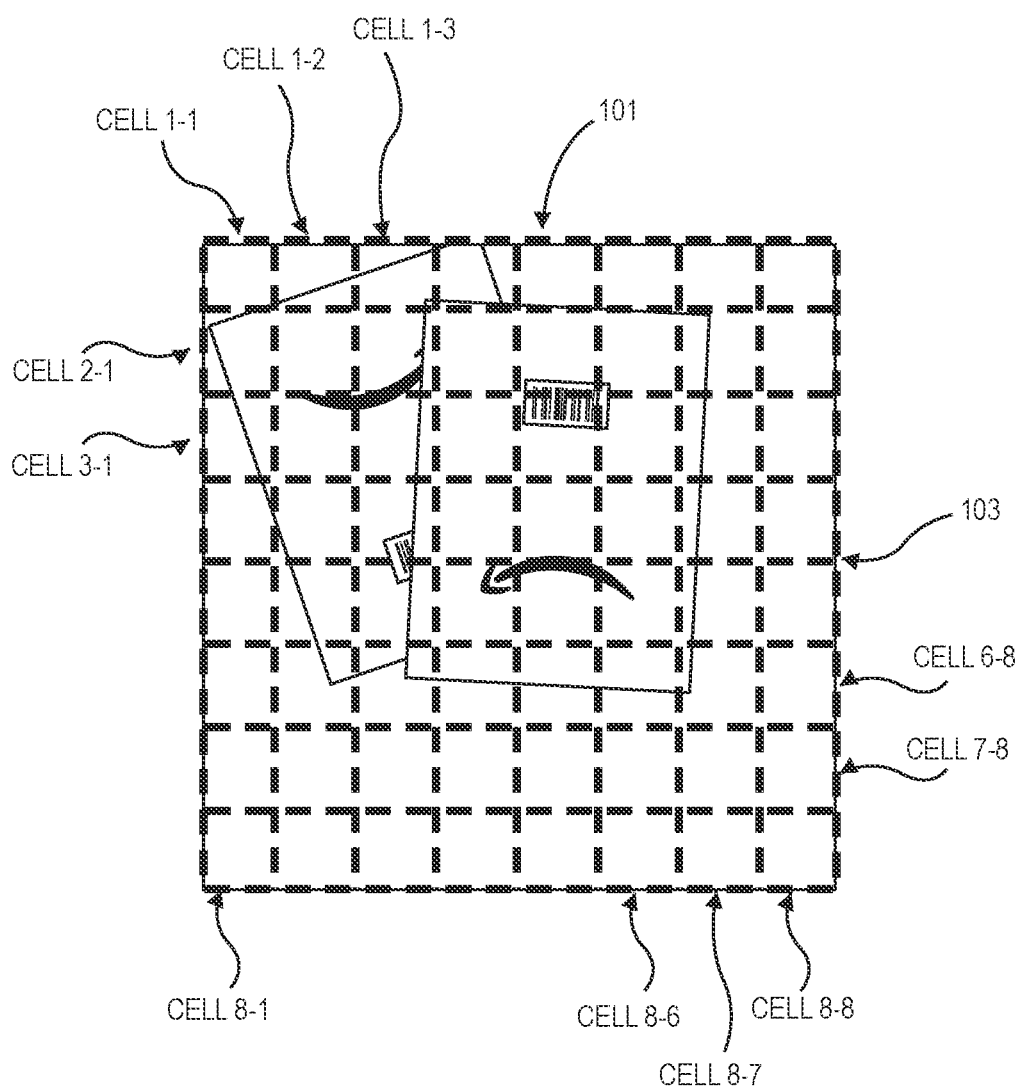
FIG. 2 is a schematic diagram of example tessellation of the imaging data into a plurality of cells, in accordance with implementations of the present disclosure.

FIG. 2 is a schematic diagram of example tessellation of the imaging data into a plurality of cells, in accordance with implementations of the present disclosure.

The deep feature extraction and training tool and associated methods described herein may tessellate the imaging data of an original image. For example, using the example imaging data 101 shown in FIGS. 1A and 1B, the imaging data may be tessellated into a plurality of cells 103. In some example embodiments, the plurality of cells 103 may comprise a grid of cells, such as substantially square or rectangular cells arranged in a grid, as shown in FIG. 2. In other example embodiments, the plurality of cells 103 may have other numbers, sizes, and/or shapes, such as circles, triangles, pentagons, hexagons, other shapes, and/or combinations thereof, and may be arranged or organized in other shapes or configurations. Moreover, the numbers, sizes, shapes, and/or arrangements of cells may be selected based on various properties or attributes of the imaging data, e.g., image resolution, pixel size, field of view, focal length, a level of zoom, etc. Further, the plurality of cells 103 may comprise a hierarchical grid or arrangement of cells.

As shown in FIG. 2, the imaging data 101 may be tessellated into an eight-by-eight grid of sixty four cells. The plurality of cells 103 are described herein with reference to the row and column associated with each cell, e.g., a cell in the first row and first column is labeled Cell 1-1, a cell in the first row and second column is labeled Cell 1-2, a cell in the first row and third column is labeled Cell 1-3, a cell in the second row and first column is labeled Cell 2-1, etc. The plurality of cells 103 shown in the example of FIG. 2 may include sixty four cells beginning from an uppermost, leftmost Cell 1-1 and ending with a lowermost, rightmost Cell 8-8. In other example embodiments, various other numbers, sizes, shapes, and arrangements of cells may be generated to tessellate an original image into a plurality of cells.

As further described herein, the deep feature extraction and training tool and associated methods described herein may then mask different subsets of the plurality of cells 103 to generate a plurality of masked images. For example, masking may comprise removing imaging data from one or more cells of the plurality of cells 103, replacing imaging data of one or more cells with zero or nil data, and/or deleting one or more cells of the plurality of cells 103. Various masked images may include imaging data of at least one cell, and may remove, replace, or delete imaging data of at least one other cell.

In some example embodiments, a plurality of masked images may be generated in which each masked image includes a different subset of cells than every other masked image of the plurality of masked images. In addition, a plurality of masked images may be generated in which each cell is included in a same, total number of masked images as every other cell.

The deep feature extraction and training tool and associated methods described herein may then provide each of the plurality of masked images to the deep learning model, and receive a respective determination or decision from the deep learning model as a corresponding masked output associated with each of the plurality of masked images. For example, each masked image may be processed by the deep learning model to generate a respective masked output associated with the masked image. In addition, each masked output may be associated with a respective subset of cells of the respective masked image. Further, a plurality of masked outputs associated with the plurality of masked images may be aggregated in a matrix, table, or other datastore for each cell of the plurality of cells.

Moreover, the determination or decision associated with each masked output may comprise the same one or more possible outputs as the possible outputs from the deep learning model based on the original image. In the example of FIG. 2, the one or more possible outputs may comprise determinations that no packages are present, a single package is present, or multiple packages are present within the imaging data.

FIGS. 3A-3L are schematic diagrams of example masked images including subsets of cells of the imaging data, in accordance with implementations of the present disclosure.

Figure 3A:
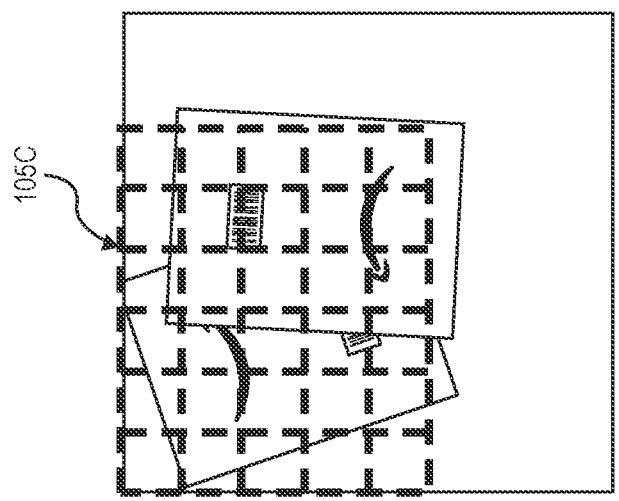
FIGS. 3A-3L are schematic diagrams of example masked images including subsets of cells of the imaging data, in accordance with implementations of the present disclosure.

As shown in FIG. 3A, the example masked image may include a subset 105A of cells of the plurality of cells 103. For example, the subset 105A of cells may include Cell 1-1 through Cell 1-8, i.e., the first row of cells. The remaining cells of the plurality of cells 103 outside of the subset 105A of cells may have imaging data removed, may have imaging data replaced by zero or nil data, or may be deleted from the masked image. Thus, the example masked image of FIG. 3A may include imaging data within only the subset 105A of cells.

Then, the subset 105A of cells may be processed by the deep learning model, and the deep learning model may generate a masked output corresponding to the masked image including the subset 105A of cells. For example, from the one or more possible outputs that comprise determinations that no packages are present, a single package is present, or multiple packages are present within the imaging data 101 of the original image of FIG. 1A, the deep learning model may generate a determination or decision that no packages are present as the masked output based on the example masked image including the subset 105A of cells, which may be consistent with the example heatmap 107 shown in FIG. 1B.

In example embodiments, the masked output, e.g., that no packages are present, may be associated with each cell of the subset 105A of cells included in the example masked image. Thus, each of Cell 1-1 through Cell 1-8 included in the subset 105A of cells may be associated with the masked output based on the example masked image. In some example embodiments, for each cell of the subset 105A of cells, the masked output may be stored or tabulated in a matrix, table, or other datastore, e.g., may be stored as a count, value, or other entry for each cell of the subset 105A of cells.

Figure 3B:
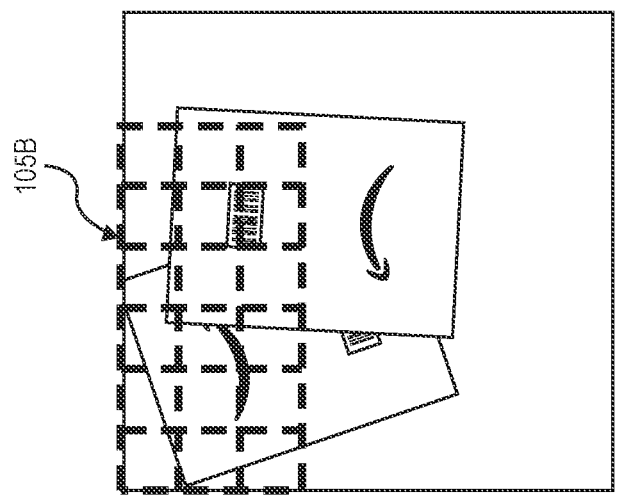

As shown in FIG. 3B, the example masked image may include a subset 105B of cells of the plurality of cells 103. For example, the subset 105B of cells may include Cell 1-1 through Cell 1-6, i.e., part of the first row of cells, Cell 2-1 through Cell 2-6, i.e., part of the second row of cells, and Cell 3-1 through Cell 3-6, i.e., part of the third row of cells. The remaining cells of the plurality of cells 103 outside of the subset 105B of cells may have imaging data removed, may have imaging data replaced by zero or nil data, or may be deleted from the masked image. Thus, the example masked image of FIG. 3B may include imaging data within only the subset 105B of cells.

Then, the subset 105B of cells may be processed by the deep learning model, and the deep learning model may generate a masked output corresponding to the masked image including the subset 105B of cells. For example, from the one or more possible outputs that comprise determinations that no packages are present, a single package is present, or multiple packages are present within the imaging data 101 of the original image of FIG. 1A, the deep learning model may generate a determination or decision that a single package is present as the masked output based on the example masked image including the subset 105B of cells, which may be consistent with the example heatmap 107 shown in FIG. 1B.

In example embodiments, the masked output, e.g., that a single package is present, may be associated with each cell of the subset 105B of cells included in the example masked image. Thus, each of Cell 1-1 through Cell 1-6, Cell 2-1 through Cell 2-6, and Cell 3-1 through Cell 3-6 included in the subset 105B of cells may be associated with the masked output based on the example masked image. In some example embodiments, for each cell of the subset 105B of cells, the masked output may be stored or tabulated in a matrix, table, or other datastore, e.g., may be stored as a count, value, or other entry for each cell of the subset 105B of cells.

Figure 3C:
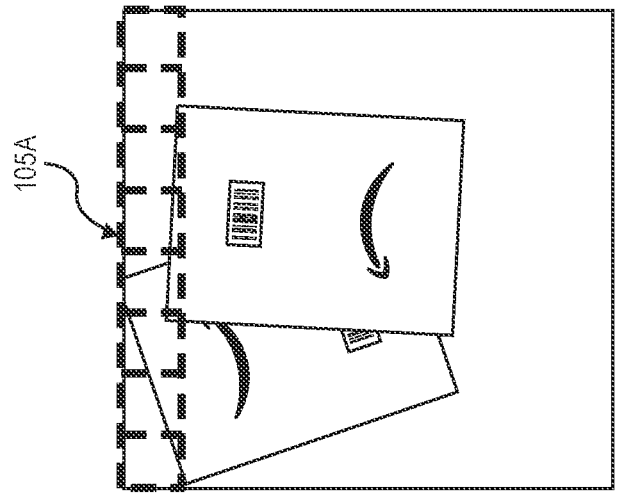

As shown in FIG. 3C, the example masked image may include a subset 105C of cells of the plurality of cells 103. For example, the subset 105C of cells may include Cell 1-1 through Cell 1-6, i.e., part of the first row of cells, Cell 2-1 through Cell 2-6, i.e., part of the second row of cells, Cell 3-1 through Cell 3-6, i.e., part of the third row of cells, Cell 4-1 through Cell 4-6, i.e., part of the fourth row of cells, and Cell 5-1 through Cell 5-6, i.e., part of the fifth row of cells. The remaining cells of the plurality of cells 103 outside of the subset 105C of cells may have imaging data removed, may have imaging data replaced by zero or nil data, or may be deleted from the masked image. Thus, the example masked image of FIG. 3C may include imaging data within only the subset 105C of cells.

Then, the subset 105C of cells may be processed by the deep learning model, and the deep learning model may generate a masked output corresponding to the masked image including the subset 105C of cells. For example, from the one or more possible outputs that comprise determinations that no packages are present, a single package is present, or multiple packages are present within the imaging data 101 of the original image of FIG. 1A, the deep learning model may generate a determination or decision that multiple packages are present as the masked output based on the example masked image including the subset 105C of cells, which may be consistent with the example heatmap 107 shown in FIG. 1B.

In example embodiments, the masked output, e.g., that multiple packages are present, may be associated with each cell of the subset 105C of cells included in the example masked image. Thus, each of Cell 1-1 through Cell 1-6, Cell 2-1 through Cell 2-6, Cell 3-1 through Cell 3-6, Cell 4-1 through Cell 4-6, and Cell 5-1 through Cell 5-6 included in the subset 105C of cells may be associated with the masked output based on the example masked image. In some example embodiments, for each cell of the subset 105C of cells, the masked output may be stored or tabulated in a matrix, table, or other datastore, e.g., may be stored as a count, value, or other entry for each cell of the subset 105C of cells.

Figure 3D:
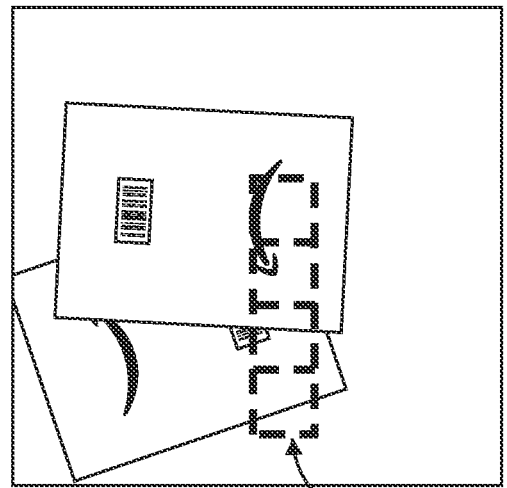

As shown in FIG. 3D, the example masked image may include a subset 105D of cells of the plurality of cells 103. For example, the subset 105D of cells may include Cell 5-2 through Cell 5-5, i.e., part of the fifth row of cells. The remaining cells of the plurality of cells 103 outside of the subset 105D of cells may have imaging data removed, may have imaging data replaced by zero or nil data, or may be deleted from the masked image. Thus, the example masked image of FIG. 3D may include imaging data within only the subset 105D of cells.

Then, the subset 105D of cells may be processed by the deep learning model, and the deep learning model may generate a masked output corresponding to the masked image including the subset 105D of cells. For example, from the one or more possible outputs that comprise determinations that no packages are present, a single package is present, or multiple packages are present within the imaging data 101 of the original image of FIG. 1A, the deep learning model may generate a determination or decision that multiple packages are present as the masked output based on the example masked image including the subset 105D of cells, which may be consistent with the example heatmap 107 shown in FIG. 1B.

In example embodiments, the masked output, e.g., that multiple packages are present, may be associated with each cell of the subset 105D of cells included in the example masked image. Thus, each of Cell 5-2 through Cell 5-5 included in the subset 105D of cells may be associated with the masked output based on the example masked image. In some example embodiments, for each cell of the subset 105D of cells, the masked output may be stored or tabulated in a matrix, table, or other datastore, e.g., may be stored as a count, value, or other entry for each cell of the subset 105D of cells.

Figure 3E:
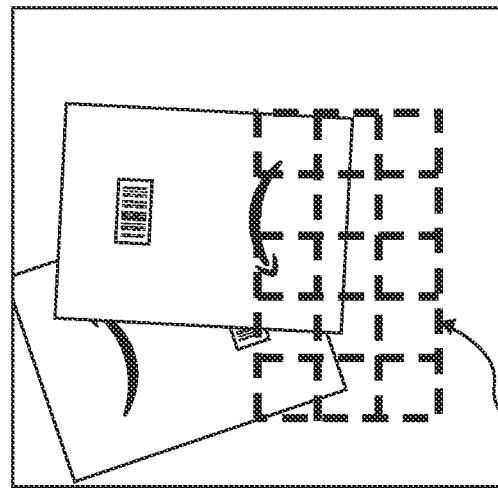

As shown in FIG. 3E, the example masked image may include a subset 105E of cells of the plurality of cells 103. For example, the subset 105E of cells may include Cell 5-2 through Cell 5-6, i.e., part of the fifth row of cells, Cell 6-2 through Cell 6-6, i.e., part of the sixth row of cells, and Cell 7-2 through Cell 7-6, i.e., part of the seventh row of cells. The remaining cells of the plurality of cells 103 outside of the subset 105E of cells may have imaging data removed, may have imaging data replaced by zero or nil data, or may be deleted from the masked image. Thus, the example masked image of FIG. 3E may include imaging data within only the subset 105E of cells.

Then, the subset 105E of cells may be processed by the deep learning model, and the deep learning model may generate a masked output corresponding to the masked image including the subset 105E of cells. For example, from the one or more possible outputs that comprise determinations that no packages are present, a single package is present, or multiple packages are present within the imaging data 101 of the original image of FIG. 1A, the deep learning model may generate a determination or decision that multiple packages are present as the masked output based on the example masked image including the subset 105E of cells, which may be consistent with the example heatmap 107 shown in FIG. 1B.

In example embodiments, the masked output, e.g., that multiple packages are present, may be associated with each cell of the subset 105E of cells included in the example masked image. Thus, each of Cell 5-2 through Cell 5-6, Cell 6-2 through Cell 6-6, and Cell 7-2 through Cell 7-6 included in the subset 105E of cells may be associated with the masked output based on the example masked image. In some example embodiments, for each cell of the subset 105E of cells, the masked output may be stored or tabulated in a matrix, table, or other datastore, e.g., may be stored as a count, value, or other entry for each cell of the subset 105E of cells.

Figure 3F:
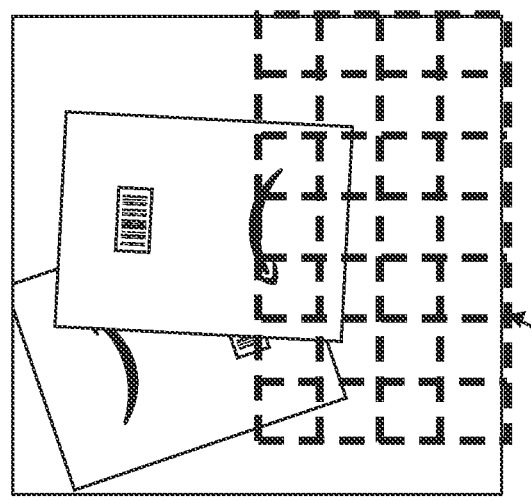

As shown in FIG. 3F, the example masked image may include a subset 105F of cells of the plurality of cells 103. For example, the subset 105F of cells may include Cell 5-2 through Cell 5-8, i.e., part of the fifth row of cells, Cell 6-2 through Cell 6-8, i.e., part of the sixth row of cells, Cell 7-2 through Cell 7-8, i.e., part of the seventh row of cells, and Cell 8-2 through Cell 8-8, i.e., part of the eighth row of cells. The remaining cells of the plurality of cells 103 outside of the subset 105F of cells may have imaging data removed, may have imaging data replaced by zero or nil data, or may be deleted from the masked image. Thus, the example masked image of FIG. 3F may include imaging data within only the subset 105F of cells.

Then, the subset 105F of cells may be processed by the deep learning model, and the deep learning model may generate a masked output corresponding to the masked image including the subset 105F of cells. For example, from the one or more possible outputs that comprise determinations that no packages are present, a single package is present, or multiple packages are present within the imaging data 101 of the original image of FIG. 1A, the deep learning model may generate a determination or decision that multiple packages are present as the masked output based on the example masked image including the subset 105F of cells, which may be consistent with the example heatmap 107 shown in FIG. 1B.

In example embodiments, the masked output, e.g., that multiple packages are present, may be associated with each cell of the subset 105F of cells included in the example masked image. Thus, each of Cell 5-2 through Cell 5-8, Cell 6-2 through Cell 6-8, Cell 7-2 through Cell 7-8, and Cell 8-2 through Cell 8-8 included in the subset 105F of cells may be associated with the masked output based on the example masked image. In some example embodiments, for each cell of the subset 105F of cells, the masked output may be stored or tabulated in a matrix, table, or other datastore, e.g., may be stored as a count, value, or other entry for each cell of the subset 105F of cells.

Figure 3I:
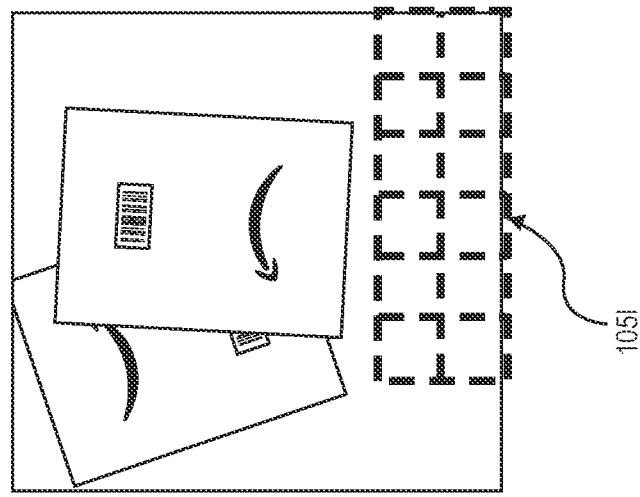
Figure 3H:
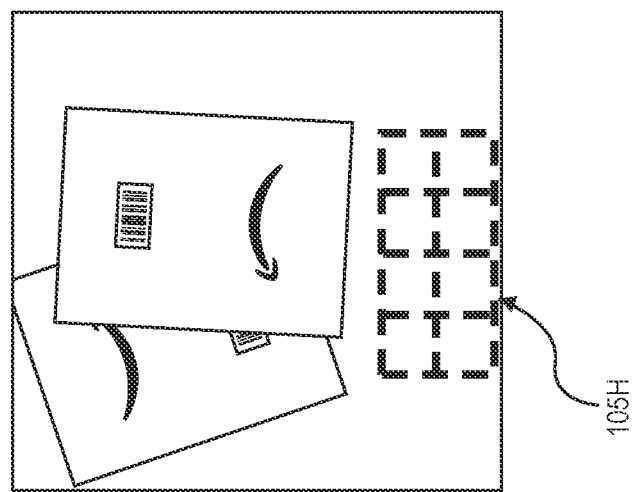
Figure 3G:
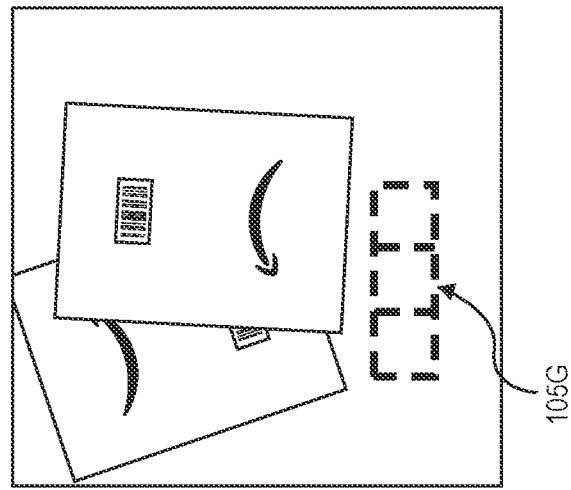

As shown in FIG. 3G, the example masked image may include a subset 105G of cells of the plurality of cells 103. For example, the subset 105G of cells may include Cell 7-3 through Cell 7-5, i.e., part of the seventh row of cells. The remaining cells of the plurality of cells 103 outside of the subset 105G of cells may have imaging data removed, may have imaging data replaced by zero or nil data, or may be deleted from the masked image. Thus, the example masked image of FIG. 3G may include imaging data within only the subset 105G of cells.

Then, the subset 105G of cells may be processed by the deep learning model, and the deep learning model may generate a masked output corresponding to the masked image including the subset 105G of cells. For example, from the one or more possible outputs that comprise determinations that no packages are present, a single package is present, or multiple packages are present within the imaging data 101 of the original image of FIG. 1A, the deep learning model may generate a determination or decision that no packages are present as the masked output based on the example masked image including the subset 105G of cells, which may be consistent with the example heatmap 107 shown in FIG. 1B.

In example embodiments, the masked output, e.g., that no packages are present, may be associated with each cell of the subset 105G of cells included in the example masked image. Thus, each of Cell 7-3 through Cell 7-5 included in the subset 105G of cells may be associated with the masked output based on the example masked image. In some example embodiments, for each cell of the subset 105G of cells, the masked output may be stored or tabulated in a matrix, table, or other datastore, e.g., may be stored as a count, value, or other entry for each cell of the subset 105G of cells.

As shown in FIG. 3H, the example masked image may include a subset 105H of cells of the plurality of cells 103. For example, the subset 105H of cells may include Cell 7-3 through Cell 7-6, i.e., part of the seventh row of cells, and Cell 8-3 through Cell 8-6, i.e., part of the eighth row of cells. The remaining cells of the plurality of cells 103 outside of the subset 105H of cells may have imaging data removed, may have imaging data replaced by zero or nil data, or may be deleted from the masked image. Thus, the example masked image of FIG. 3H may include imaging data within only the subset 105H of cells.

Then, the subset 105H of cells may be processed by the deep learning model, and the deep learning model may generate a masked output corresponding to the masked image including the subset 105H of cells. For example, from the one or more possible outputs that comprise determinations that no packages are present, a single package is present, or multiple packages are present within the imaging data 101 of the original image of FIG. 1A, the deep learning model may generate a determination or decision that no packages are present as the masked output based on the example masked image including the subset 105H of cells, which may be consistent with the example heatmap 107 shown in FIG. 1B.

In example embodiments, the masked output, e.g., that no packages are present, may be associated with each cell of the subset 105H of cells included in the example masked image. Thus, each of Cell 7-3 through Cell 7-6 and Cell 8-3 through Cell 8-6 included in the subset 105H of cells may be associated with the masked output based on the example masked image. In some example embodiments, for each cell of the subset 105H of cells, the masked output may be stored or tabulated in a matrix, table, or other datastore, e.g., may be stored as a count, value, or other entry for each cell of the subset 105H of cells.

As shown in FIG. 3I, the example masked image may include a subset 105I of cells of the plurality of cells 103. For example, the subset 105I of cells may include Cell 7-3 through Cell 7-8, i.e., part of the seventh row of cells, and Cell 8-3 through Cell 8-8, i.e., part of the eighth row of cells. The remaining cells of the plurality of cells 103 outside of the subset 105I of cells may have imaging data removed, may have imaging data replaced by zero or nil data, or may be deleted from the masked image. Thus, the example masked image of FIG. 3I may include imaging data within only the subset 105I of cells.

Then, the subset 105I of cells may be processed by the deep learning model, and the deep learning model may generate a masked output corresponding to the masked image including the subset 105I of cells. For example, from the one or more possible outputs that comprise determinations that no packages are present, a single package is present, or multiple packages are present within the imaging data 101 of the original image of FIG. 1A, the deep learning model may generate a determination or decision that no packages are present as the masked output based on the example masked image including the subset 105I of cells, which may be consistent with the example heatmap 107 shown in FIG. 1B.

In example embodiments, the masked output, e.g., that no packages are present, may be associated with each cell of the subset 105I of cells included in the example masked image. Thus, each of Cell 7-3 through Cell 7-8 and Cell 8-3 through Cell 8-8 included in the subset 105I of cells may be associated with the masked output based on the example masked image. In some example embodiments, for each cell of the subset 105I of cells, the masked output may be stored or tabulated in a matrix, table, or other datastore, e.g., may be stored as a count, value, or other entry for each cell of the subset 105I of cells.

Figure 3L:
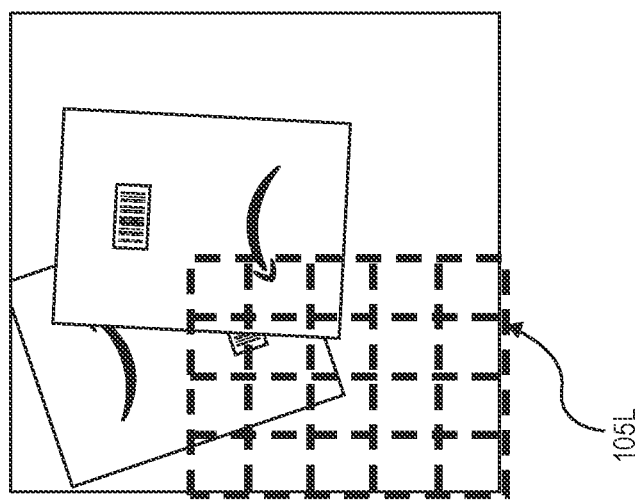
Figure 3K:
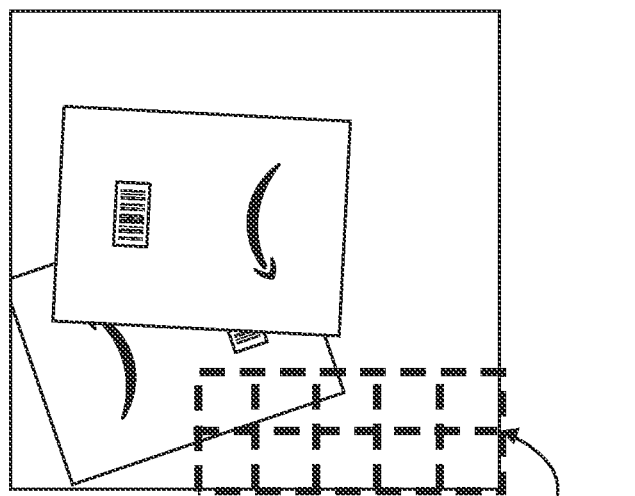
Figure 3J:
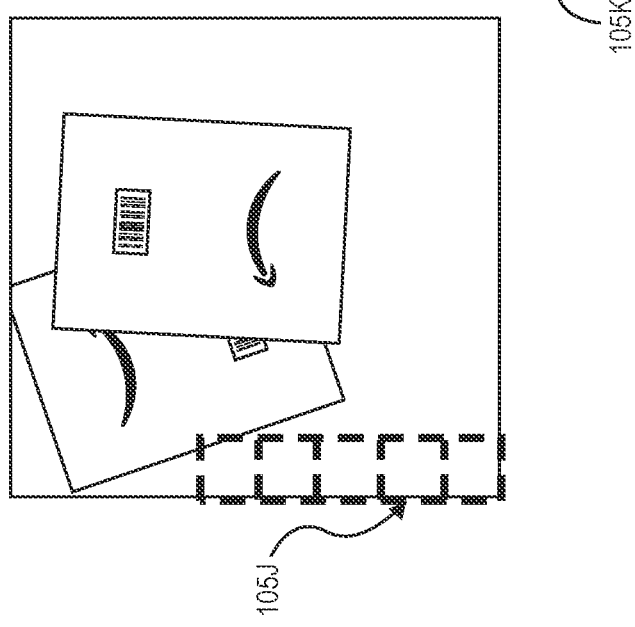

As shown in FIG. 3J, the example masked image may include a subset 105J of cells of the plurality of cells 103. For example, the subset 105J of cells may include Cell 4-1, Cell 5-1, Cell 6-1, Cell 7-1, and Cell 8-1, i.e., part of the first column of cells. The remaining cells of the plurality of cells 103 outside of the subset 105J of cells may have imaging data removed, may have imaging data replaced by zero or nil data, or may be deleted from the masked image. Thus, the example masked image of FIG. 3J may include imaging data within only the subset 105J of cells.

Then, the subset 105J of cells may be processed by the deep learning model, and the deep learning model may generate a masked output corresponding to the masked image including the subset 105J of cells. For example, from the one or more possible outputs that comprise determinations that no packages are present, a single package is present, or multiple packages are present within the imaging data 101 of the original image of FIG. 1A, the deep learning model may generate a determination or decision that no packages are present as the masked output based on the example masked image including the subset 105J of cells, which may be consistent with the example heatmap 107 shown in FIG. 1B.

In example embodiments, the masked output, e.g., that no packages are present, may be associated with each cell of the subset 105J of cells included in the example masked image. Thus, each of Cell 4-1, Cell 5-1, Cell 6-1, Cell 7-1, and Cell 8-1 included in the subset 105J of cells may be associated with the masked output based on the example masked image. In some example embodiments, for each cell of the subset 105J of cells, the masked output may be stored or tabulated in a matrix, table, or other datastore, e.g., may be stored as a count, value, or other entry for each cell of the subset 105J of cells.

As shown in FIG. 3K, the example masked image may include a subset 105K of cells of the plurality of cells 103. For example, the subset 105K of cells may include Cell 4-1, Cell 5-1, Cell 6-1, Cell 7-1, and Cell 8-1, i.e., part of the first column of cells, and Cell 4-2, Cell 5-2, Cell 6-2, Cell 7-2, and Cell 8-2, i.e., part of the second column of cells. The remaining cells of the plurality of cells 103 outside of the subset 105K of cells may have imaging data removed, may have imaging data replaced by zero or nil data, or may be deleted from the masked image. Thus, the example masked image of FIG. 3K may include imaging data within only the subset 105K of cells.

Then, the subset 105K of cells may be processed by the deep learning model, and the deep learning model may generate a masked output corresponding to the masked image including the subset 105K of cells. For example, from the one or more possible outputs that comprise determinations that no packages are present, a single package is present, or multiple packages are present within the imaging data 101 of the original image of FIG. 1A, the deep learning model may generate a determination or decision that a single package is present as the masked output based on the example masked image including the subset 105K of cells, which may be consistent with the example heatmap 107 shown in FIG. 1B.

In example embodiments, the masked output, e.g., that a single package is present, may be associated with each cell of the subset 105K of cells included in the example masked image. Thus, each of Cell 4-1, Cell 5-1, Cell 6-1, Cell 7-1, Cell 8-1, Cell 4-2, Cell 5-2, Cell 6-2, Cell 7-2, and Cell 8-2 included in the subset 105K of cells may be associated with the masked output based on the example masked image. In some example embodiments, for each cell of the subset 105K of cells, the masked output may be stored or tabulated in a matrix, table, or other datastore, e.g., may be stored as a count, value, or other entry for each cell of the subset 105K of cells.

As shown in FIG. 3L, the example masked image may include a subset 105L of cells of the plurality of cells 103. For example, the subset 105L of cells may include Cell 4-1, Cell 5-1, Cell 6-1, Cell 7-1, and Cell 8-1, i.e., part of the first column of cells, Cell 4-2, Cell 5-2, Cell 6-2, Cell 7-2, and Cell 8-2, i.e., part of the second column of cells, Cell 4-3, Cell 5-3, Cell 6-3, Cell 7-3, and Cell 8-3, i.e., part of the third column of cells, and Cell 4-4, Cell 5-4, Cell 6-4, Cell 7-4, and Cell 8-4, i.e., part of the fourth column of cells. The remaining cells of the plurality of cells 103 outside of the subset 105L of cells may have imaging data removed, may have imaging data replaced by zero or nil data, or may be deleted from the masked image. Thus, the example masked image of FIG. 3L may include imaging data within only the subset 105L of cells.

Then, the subset 105L of cells may be processed by the deep learning model, and the deep learning model may generate a masked output corresponding to the masked image including the subset 105L of cells. For example, from the one or more possible outputs that comprise determinations that no packages are present, a single package is present, or multiple packages are present within the imaging data 101 of the original image of FIG. 1A, the deep learning model may generate a determination or decision that multiple packages are present as the masked output based on the example masked image including the subset 105L of cells, which may be consistent with the example heatmap 107 shown in FIG. 1B.

In example embodiments, the masked output, e.g., that multiple packages are present, may be associated with each cell of the subset 105L of cells included in the example masked image. Thus, each of Cell 4-1, Cell 5-1, Cell 6-1, Cell 7-1, Cell 8-1, Cell 4-2, Cell 5-2, Cell 6-2, Cell 7-2, Cell 8-2, Cell 4-3, Cell 5-3, Cell 6-3, Cell 7-3, Cell 8-3, Cell 4-4, Cell 5-4, Cell 6-4, Cell 7-4, and Cell 8-4 included in the subset 105L of cells may be associated with the masked output based on the example masked image. In some example embodiments, for each cell of the subset 105L of cells, the masked output may be stored or tabulated in a matrix, table, or other datastore, e.g., may be stored as a count, value, or other entry for each cell of the subset 105L of cells.

FIGS. 3A-3L illustrate only a portion of the possible subsets 105 of cells that may be used to generate a plurality of masked images. As described herein, in some example embodiments, a plurality of masked images may be generated in which each masked image includes a different subset of cells than every other masked image of the plurality of masked images. In addition, a plurality of masked images may be generated in which each cell is included in a same, total number of masked images as every other cell.

In example embodiments in which each cell is included in a same, total number of masked images as every other cell, the aggregation or tabulation of a plurality of masked outputs for each cell may also result in a same, total number of counts, values, or entries in the matrix, table, or datastore as every other cell. That is, each cell may have the same, total number of entries related to masked outputs as every other cell. This may facilitate a substantially even or equal comparison between masked outputs for each cell.

For each cell, the aggregation of the plurality of masked outputs associated with each cell may include one or more masked outputs that no packages are present, one or more masked outputs that a single package is present, and/or one or more masked outputs that multiple packages are present. As part of, or following, the aggregation or tabulation of the plurality of masked outputs for each cell, a number of masked outputs for each cell that match or correspond to the original output from the deep learning model based on the original image may be determined. For example, in the example of FIGS. 1A and 1B, the original output may be a determination or decision that multiple packages are present within the imaging data 101 of the original image. Then, based on the aggregation of the plurality of masked outputs for each cell of the plurality of cells 103, a number of masked outputs that match or correspond to the original output that multiple packages are present may be determined for each cell.

Individual cells of the plurality of cells 103 having a higher number of masked outputs that match or correspond to the original output may be more important or influential with respect to generating, by the deep learning model, the original output based on the original image. Conversely, individual cells of the plurality of cells 103 having a lower number of masked outputs that match or correspond to the original output may be less important or influential with respect to generating, by the deep learning model, the original output based on the original image. Various different thresholds related to numbers of masked outputs that match or correspond to the original output may be used to determine whether a particular cell is more or less important or influential for the deep learning model.

Accordingly, those cells having a higher number of masked outputs that match or correspond to the original output may constitute or correspond to one or more deep features utilized by the deep learning model to generate determinations or decisions. In addition, image regions that correspond to the cells having a higher number of masked outputs that match or correspond to the original output may constitute or correspond to the one or more deep features utilized by the deep learning model.

As shown and described with respect to FIG. 1B, a heatmap 107 may be generated based on the numbers of masked outputs that match or correspond to the original output for each cell, in order to visualize individual cells and associated image regions that may constitute deep features. As described herein, individual cells and associated image regions that are darkly shaded and/or tightly hatched, such as those cells generally slightly below and toward a left side of a center of the imaging data 101 of FIG. 1B may comprise one or more deep features. In contrast, individual cells and associated image regions that are lightly shaded and/or widely hatched, such as those cells generally around a periphery of the imaging data 101 of FIG. 1B may not comprise one or more deep features.

In the example illustrated in FIGS. 1A and 1B, the original output may be a good or correct decision by a deep learning model that multiple packages are present within the imaging data 101. In addition, the one or more deep features corresponding to individual cells and associated image regions may be considered appropriate or good deep features that lead to correct decisions by the deep learning model.

However, in other example embodiments, the original output may be a bad or incorrect decision by a deep learning model with respect to processed imaging data. In such scenarios, the one or more deep features corresponding to individual cells and associated image regions may be considered inappropriate or bad deep features that lead to incorrect decisions by the deep learning model.

In both cases of correct decisions and incorrect decisions by a deep learning model, and corresponding deep features that may lead to correct decisions and incorrect decisions, the extracted and identified deep features may enable understanding of particular image regions that lead to such decisions. In addition, the identified deep features may be used to further train, refine, or modify one or more deep learning models. For example, in the case of identified deep features that lead to correct decisions by deep learning models, such deep features may continue to be used to reinforce and train one or more deep learning models to focus on such appropriate or good deep features, and to continue to generate correct decisions. Further, in the case of identified deep features that lead to incorrect decisions by deep learning models, such deep features may also be used to train or modify one or more deep learning models to remove or ignore such inappropriate or bad deep features, and to subsequently generate correct decisions.

Figure 4B:
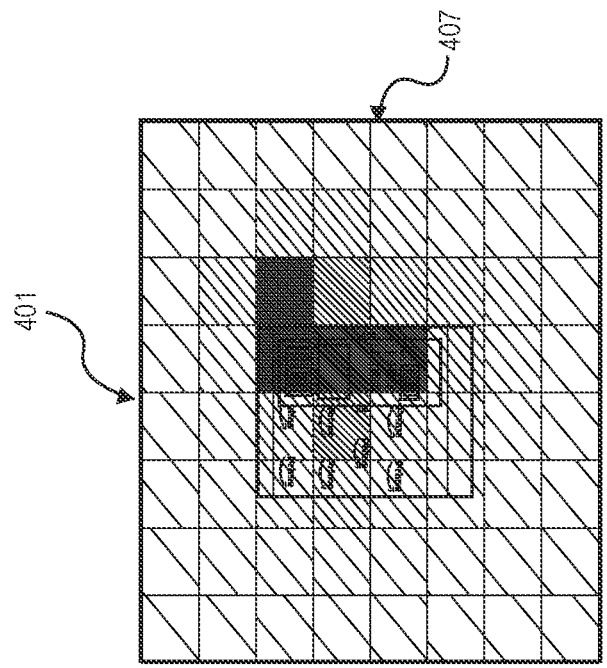
FIG. 4B is a schematic diagram of another example heatmap overlaid onto the imaging data, in accordance with implementations of the present disclosure.
Figure 4A:
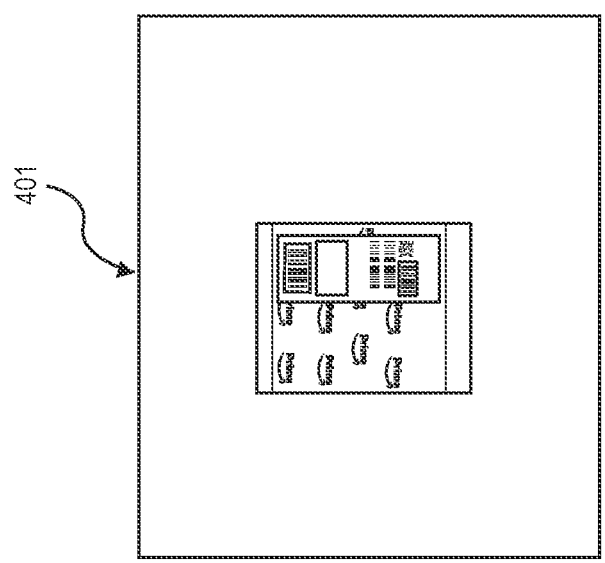
FIG. 4A is a schematic diagram of another example imaging data, in accordance with implementations of the present disclosure.

FIG. 4A is a schematic diagram of another example imaging data, in accordance with implementations of the present disclosure.

Imaging data captured by one or more cameras, imaging sensors, or other types of imaging devices may include representations of one or more objects, items, vehicles, people, clothing, buildings, signs, locations, portions of an environment, or various other types of objects. As shown in FIG. 4A, the example imaging data 401 may include a representation of a single package having one or more applied labels with a plurality of associated identifiers.

For the example imaging data 401 of FIG. 4A, a deep learning model may receive and process the imaging data 401 of an original image, and output an original determination or decision that the imaging data 401 of the original image includes representations of multiple packages. This may be a bad or incorrect decision with respect to the example imaging data 401 of the original image. Although the deep learning model may make an incorrect decision with respect to the example imaging data 401 of the original image, it may be difficult or impossible to understand why or how the deep learning model made the incorrect determination, as only the inputs and outputs of the deep learning model are generally visible or available for review or analysis. Thus, the deep feature extraction and training tool and associated methods described herein may facilitate extraction and understanding of deep features and corresponding image regions of imaging data that may lead to correct or incorrect decisions by deep learning models.

FIG. 4B is a schematic diagram of another example heatmap overlaid onto the imaging data, in accordance with implementations of the present disclosure.

The deep feature extraction and training tool and associated methods described herein may generate and overlay a heatmap 407 onto the imaging data 401 to visualize one or more deep features associated with image regions of imaging data 401, as shown in FIGS. 4A and 4B. The heatmap 407 may be generated based on the number of times that the masked outputs for each cell correspond to the original output. In the example of FIGS. 4A and 4B, each cell of the heatmap 407 is shaded or hatched based on the number of times that the masked outputs for each cell correspond to the original output. For example, lightly shaded or widely hatched cells, such as cells generally around a periphery of the imaging data 401, may indicate that a small or low number of masked outputs for such cells corresponds to the original output. In contrast, darkly shaded or tightly hatched cells, such as cells generally slightly toward a right side of a center of the imaging data 401, may indicate that a large or high number of masked outputs for such cells corresponds to the original output.

As a result, cells that may be darkly shaded or tightly hatched may constitute or correspond to deep features utilized by the deep learning model to determine the original output. Accordingly, image regions of the imaging data 401 that are associated with the darkly shaded cells may correspond to the deep features. Likewise, cells that may be lightly shaded or widely hatched may not constitute or correspond to deep features utilized by the deep learning model to determine the original output. In addition, image regions of the imaging data 401 that are associated with the lightly shaded cells may not correspond to the deep features.

In example embodiments, the heatmap 407 may be generated based on a count, summation, or aggregation of the number of times that various masked outputs for each cell match or correspond to the original output. In further example embodiments, the heatmap 407 may be generated using various proportions, percentages, fractions, averages, or other mathematic or arithmetic functions based on the various masked outputs for each cell relative to the original output.

As further described herein, in order to extract deep features and generate a heatmap 407, the deep feature extraction and training tool and associated methods described herein may tessellate the imaging data of an original image. For example, using the example imaging data 401 shown in FIGS. 4A and 4B, the imaging data may be tessellated into a plurality of cells. In some example embodiments, the plurality of cells may comprise a grid of cells, such as substantially square or rectangular cells arranged in a grid, as shown in FIG. 4B. In other example embodiments, the plurality of cells may have other numbers, sizes, and/or shapes, such as circles, triangles, pentagons, hexagons, other shapes, and/or combinations thereof, and may be arranged or organized in other shapes or configurations.

As shown in FIG. 4B, the imaging data 401 may be tessellated into an eight-by-eight grid of sixty four cells. The plurality of cells are described herein with reference to the row and column associated with each cell. For example, the plurality of cells shown in the example of FIG. 4B may include sixty four cells beginning from an uppermost, leftmost Cell 1-1 and ending with a lowermost, rightmost Cell 8-8. In other example embodiments, various other numbers, sizes, shapes, and arrangements of cells may be generated to tessellate an original image into a plurality of cells.

As described herein, the deep feature extraction and training tool and associated methods described herein may then mask different subsets of the plurality of cells to generate a plurality of masked images. For example, masking may comprise removing imaging data from one or more cells of the plurality of cells, replacing imaging data of one or more cells with zero or nil data, and/or deleting one or more cells of the plurality of cells. Various masked images may include imaging data of at least one cell, and may remove, replace, or delete imaging data of at least one other cell.

In some example embodiments, a plurality of masked images may be generated in which each masked image includes a different subset of cells than every other masked image of the plurality of masked images. In addition, a plurality of masked images may be generated in which each cell is included in a same, total number of masked images as every other cell.

The deep feature extraction and training tool and associated methods described herein may then provide each of the plurality of masked images to the deep learning model, and receive a respective determination or decision from the deep learning model as a corresponding masked output associated with each of the plurality of masked images. For example, each masked image may be processed by the deep learning model to generate a respective masked output associated with the masked image. In addition, each masked output may be associated with a respective subset of cells of the respective masked image. Further, a plurality of masked outputs associated with the plurality of masked images may be aggregated in a matrix, table, or other datastore for each cell of the plurality of cells.

Moreover, the determination or decision associated with each masked output may comprise the same one or more possible outputs as the possible outputs from the deep learning model based on the original image. In the example of FIGS. 4A and 4B, the one or more possible outputs may comprise determinations that no packages are present, a single package is present, or multiple packages are present within the imaging data.

The various masked outputs may be associated with and accumulated for each cell included in the respective subsets of cells. In particular, the various masked outputs that correspond to the original output based on the imaging data 401, e.g., the original determination or decision that the imaging data includes representations of multiple packages, may be associated with and accumulated for each cell included in the respective subsets of cells. In some example embodiments, for each cell of a respective subset of cells, the masked output may be stored or tabulated in a matrix, table, or other datastore, e.g., may be stored as a count, value, or other entry for each cell of the respective subset of cells.

In example embodiments in which each cell is included in a same, total number of masked images as every other cell, the aggregation or tabulation of a plurality of masked outputs for each cell may also result in a same, total number of counts, values, or entries in the matrix, table, or datastore as every other cell. That is, each cell may have the same, total number of entries related to masked outputs as every other cell. This may facilitate a substantially even or equal comparison between masked outputs for each cell.

For each cell, the aggregation of the plurality of masked outputs associated with each cell may include one or more masked outputs that no packages are present, one or more masked outputs that a single package is present, and/or one or more masked outputs that multiple packages are present. As part of, or following, the aggregation or tabulation of the plurality of masked outputs for each cell, a number of masked outputs for each cell that match or correspond to the original output from the deep learning model based on the original image may be determined. For example, in the example of FIGS. 4A and 4B, the original output may be a determination or decision that multiple packages are present within the imaging data 401 of the original image. Then, based on the aggregation of the plurality of masked outputs for each cell of the plurality of cells, a number of masked outputs that match or correspond to the original output that multiple packages are present may be determined for each cell.

Individual cells of the plurality of cells having a higher number of masked outputs that match or correspond to the original output may be more important or influential with respect to generating, by the deep learning model, the original output based on the original image. Conversely, individual cells of the plurality of cells having a lower number of masked outputs that match or correspond to the original output may be less important or influential with respect to generating, by the deep learning model, the original output based on the original image. Various different thresholds related to numbers of masked outputs that match or correspond to the original output may be used to determine whether a particular cell is more or less important or influential for the deep learning model.

Accordingly, those cells having a higher number of masked outputs that match or correspond to the original output may constitute or correspond to one or more deep features utilized by the deep learning model to generate determinations or decisions. In addition, image regions that correspond to the cells having a higher number of masked outputs that match or correspond to the original output may constitute or correspond to the one or more deep features utilized by the deep learning model.

As shown and described with respect to FIG. 4B, a heatmap 407 may be generated based on the numbers of masked outputs that match or correspond to the original output for each cell, in order to visualize individual cells and associated image regions that may constitute deep features. As described herein, individual cells and associated image regions that are darkly shaded and/or tightly hatched, such as those cells generally slightly toward a right side of a center of the imaging data 401 of FIG. 4B may comprise one or more deep features. In contrast, individual cells and associated image regions that are lightly shaded and/or widely hatched, such as those cells generally around a periphery of the imaging data 401 of FIG. 4B may not comprise one or more deep features.

In the example illustrated in FIGS. 4A and 4B, the original output may be a bad or incorrect decision by a deep learning model that multiple packages are present within the imaging data 401. In addition, the one or more deep features corresponding to individual cells and associated image regions may be considered inappropriate or bad deep features that lead to incorrect decisions by the deep learning model.

However, in other example embodiments, the original output may be a good or correct decision by a deep learning model with respect to processed imaging data. In such scenarios, the one or more deep features corresponding to individual cells and associated image regions may be considered appropriate or good deep features that lead to correct decisions by the deep learning model.

In both cases of correct decisions and incorrect decisions by a deep learning model, and corresponding deep features that may lead to correct decisions and incorrect decisions, the extracted and identified deep features may enable understanding of particular image regions that lead to such decisions. In addition, the identified deep features may be used to further train, refine, or modify one or more deep learning models. For example, in the case of identified deep features that lead to correct decisions by deep learning models, such deep features may continue to be used to reinforce and train one or more deep learning models to focus on such appropriate or good deep features, and to continue to generate correct decisions. Further, in the case of identified deep features that lead to incorrect decisions by deep learning models, such deep features may also be used to train or modify one or more deep learning models to remove or ignore such inappropriate or bad deep features, and to subsequently generate correct decisions.

In addition, based on extracted deep features of a deep learning model, portions of imaging data that correspond to one or more cells associated with extracted deep features may be identified. Then, the identified portions of imaging data may be provided to annotation services, e.g., automated, semi-automated, or manual annotation services. The annotation services may process and annotate the identified portions of imaging data as appropriate or good deep features that lead to correct decisions, or as inappropriate or bad deep features that lead to incorrect decisions. In this manner, a reduced set of imaging data may be provided to annotation services for processing, thereby facilitating faster and more efficient processing of substantially only those portions of imaging data that may be associated with extracted deep features. Then, the annotated portions of imaging data may be used to train, refine, or modify deep learning models based on the extracted deep features.

In additional example embodiments, based on extracted deep features of a plurality of deep learning models, one or more deep learning models may be selected for use or implementation in particular applications and/or environments. For example, based on various characteristics or attributes associated with a desired application and/or environment, it may be determined that extracted deep features associated with a first deep learning model may be better suited and lead to more correct decisions than extracted deep features associated with a second deep learning model. Because of the understanding of deep features enabled by the deep feature extraction and training tools and methods described herein, deep learning models may be more reliably and accurately selected for particular implementations, in order to ensure greater confidence in the determinations or decisions of such deep learning models in various applications and/or environment.

In other example embodiments, the deep feature extraction and training tools and methods described herein may be used to extract deep features utilized by deep learning models over time. For example, at a first time, one or more deep features may be extracted from a deep learning model based on input data to understand the deep features that may lead to correct or incorrect decisions. Then, at a second time different than the first time, one or more second deep features may be extracted from the deep learning model based on the same input data to understand the second deep features that may lead to correct or incorrect decisions. Differences between the second deep features at the second time and the deep features at the first time, when processing the same input data, may be used to gain an understanding into why or how the deep learning model changed over time. For example, various input data or other training data that may have been provided to the deep learning model between the first time and the second time may be analyzed to determine why or how the deep features utilized by the deep learning model changed over time. In addition, the deep learning model may then be further trained, refined, or modified with additional input or training data to utilize desired deep features to make determinations.

Moreover, deep learning models may be intentionally trained or modified to use or focus on particular deep features, based on the understanding of deep features enabled by the deep feature extraction and training tools and methods described herein. In addition, one or more similar deep learning models may be intentionally trained to utilize different deep features as desired, e.g., for different applications and/or environments.

In further example embodiments, the deep feature extraction and training tools and methods described herein may be used to test or understand the potential impact of changes to characteristics or attributes of various applications and/or environments in which deep learning models may be implemented. For example, in the context of package detection, new or different types of packages, packing materials, tapes, colors, symbols, graphics, and/or various other visual features may be processed by the deep feature extraction and training tools and methods to extract and gain an understanding of deep features utilized by deep learning models to make determinations or decisions related to the new or different attributes of packages. The outputs of the deep feature extraction and training tools and methods may be used to facilitate design of new or different attributes of packages that lead to correct decisions by deep learning models, as well as to train or modify deep learning models to make correct decisions based on the new or different attributes of packages. Similarly, the outputs of the deep feature extraction and training tools and methods may be used to avoid or prevent other changes to attributes of packages that may lead to incorrect decisions by deep learning models, as well as to train or modify deep learning models to avoid incorrect decisions based on the new or different attributes of packages.

In still further example embodiments, the deep feature extraction and training tools and methods described herein may be used to identify, cause, and/or instruct various changes to applications and/or environments in which deep learning models may be implemented. For example, various characteristics or attributes that may be represented in imaging data and that correspond to aspects or portions of the applications or environments may be removed, changed, added, or otherwise modified to facilitate correct determinations or decisions by the deep learning models. Portions of environments that may be used by a deep learning model as deep features that lead to incorrect decisions may be removed or modified to cause the deep learning model to remove or ignore such deep features, and thereby make correct decisions. Likewise, portions of environments that may be used by a deep learning model as deep features that lead to correct decisions may be added or modified to cause the deep learning model to identify or use such deep features, and thereby make correct decisions.

In addition, various changes, instructions, or data may be provided to automated or semi-automated machinery, equipment, or systems, as well as to human agents or associates, to cause the presence of good deep features represented within imaging data, and/or the absence of bad deep features represented within imaging data, such that the deep learning model may thereby make correct decisions with respect to imaging data. For example, in the context of package detection, various changes or instructions may comprise separating or singulating packages, utilizing certain types of packing materials, avoiding use of other types of packing materials, providing additional instructions or training related to certain operations or processes, and/or various other changes or instructions that may result in the presence of good deep features and/or the absence of bad deep features represented within imaging data.

In yet additional example embodiments, based on the understanding of deep features enabled by the deep feature extraction and training tools and methods described herein, salient image regions that correspond to extracted deep features may be identified. The salient image regions and their associated characteristics or attributes may comprise those image regions that correspond to the extracted deep features utilized by a deep learning model, such as one or more cells and associated image regions of the tessellated imaging data described herein.

The salient image regions corresponding to extracted deep features may be converted to hash codes, hash keys, or similar data abstractions. The hash codes may be stored in a hashmap, hash table, matrix, table, or other datastore with other related hash codes for associated deep learning models. For example, hash codes of salient image regions that correspond to deep features that lead to correct decisions by deep learning models may be stored. In addition, hash codes of salient image regions that correspond to deep features that lead to incorrect decisions by deep learning models may also be stored.

Then, when processing new imaging data by the deep learning models, the new imaging data may be divided into image regions, and those image regions may be converted to hash codes, hash keys, or similar data abstractions, e.g., in the same manner as done for the salient image regions. The hash codes corresponding to image regions of the new imaging data may be compared with stored hash codes corresponding to the salient image regions. Then, substantially only those hash codes of the new imaging data that correspond to stored hash codes that lead to correct decisions may be selected for processing by the deep learning models, e.g., hash codes that may be within a threshold value or amount of the stored hash codes. In addition, those hash codes of the new imaging data that correspond to stored hash codes that lead to incorrect decisions may be deselected or removed from processing by the deep learning models. Other hash codes of the new imaging data that do not correspond to any stored hash codes may also be removed or ignored.

Then, the image regions corresponding to the selected hash codes may be provided to the deep learning models for processing. Likewise, other image regions of the new imaging data that do not correspond to any selected hash codes may be removed, ignored, or not provided to the deep learning models. In this manner, processing of new imaging data by deep learning models may be performed faster and more efficiently by providing and focusing only on those image regions of new imaging data that may potentially impact decisions by the deep learning models, based on the understanding of deep features enabled by the deep feature extraction and training tools and methods described herein.

Accordingly, the deep feature extraction and training tools and methods described herein may provide valuable insight and understanding into one or more deep features utilized by deep learning models to make decisions, whether correct or incorrect. Such understanding may facilitate more efficient, reliable, robust, and tailored implementations of deep learning models, e.g., in the context of computer vision, image processing, or other related applications described herein.

In other example embodiments, various deep features associated with other types or classes of deep learning models, algorithms, or neural networks that may process other types of data, instead of imaging data as described herein, may also be extracted, understood, refined, trained, or modified in similar manner as described herein using the deep feature extraction and training tools and associated methods. For example, the deep feature extraction and training tool may tessellate the data, mask, remove, or delete portions of the data, and aggregate outputs based on the masked portions, in order to extract deep features utilized by such deep learning models that may process other types of data.

Figure 5:
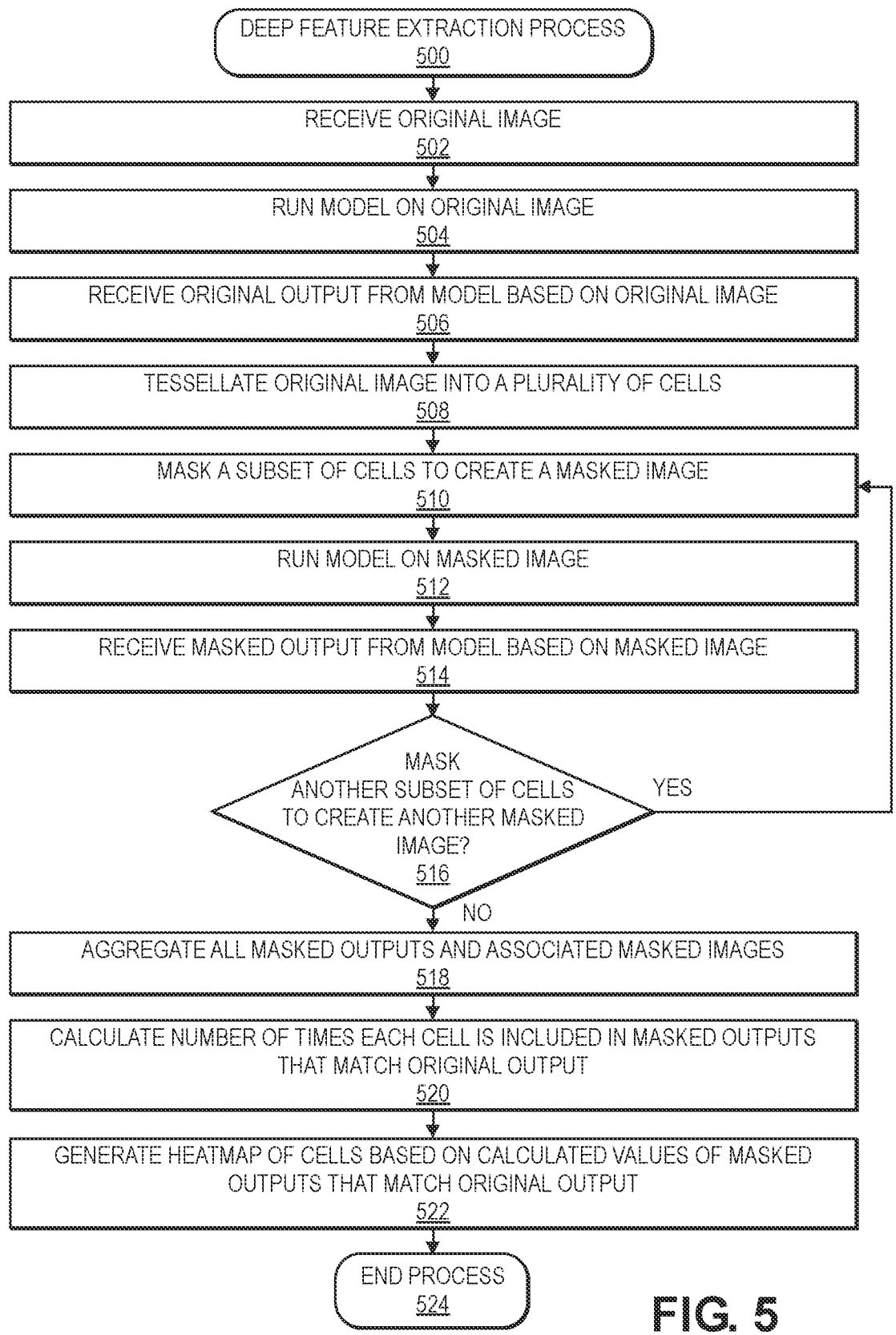
FIG. 5 is a flow diagram illustrating an example deep feature extraction process, in accordance with implementations of the present disclosure.

FIG. 5 is a flow diagram illustrating an example deep feature extraction process 500, in accordance with implementations of the present disclosure.

The process 500 may begin by receiving an original image, as at 502. For example, a camera, imaging device, or imaging sensor may capture imaging data of an original image. In various example embodiments, the imaging data may include representations of one or more objects, items, packages, envelopes, vehicles, people, clothing, buildings, signs, locations, portions of an environment, or various other types of objects in various types of applications and/or environments. Further, a control system may receive the imaging data of the original image.

The process 500 may continue by running a model on the original image, as at 504. For example, a deep learning model, such as a deep neural network or other types of deep learning models or algorithms, may receive and process the imaging data of the original image. The deep learning model may process, analyze, detect, identify, classify, and/or recognize one or more objects within the imaging data, as well as one or more characteristics or attributes associated with the objects. Further, a control system may instruct or command processing of the imaging data of the original image by the deep learning model.

The process 500 may proceed by receiving an original output from the model based on the original image, as at 506. For example, after processing the imaging data, the deep learning model may generate one or more possible outputs based on the imaging data of the original image. In various example embodiments, the possible outputs may comprise two or more determinations, decisions, or outputs based on representations of one or more objects within the imaging data of the original image. Further, a control system may receive the original output based on the imaging data of the original image.

The process 500 may continue to tessellate the original image into a plurality of cells, as at 508. For example, the deep feature extraction and training tool may receive the original image, and tessellate the original image into a plurality of cells. Various sizes, shapes, numbers, and arrangements of cells may be used to tessellate imaging data of an original image into a plurality of cells. Further, a control system may instruct or command tessellation of the imaging data of the original image into a plurality of cells by the deep feature extraction and training tool.

The process 500 may proceed to mask a subset of cells to create a masked image, as at 510. For example, one or more cells of the imaging data may be selected for processing, and one or more other cells of the imaging data may be removed, replaced, or deleted, e.g., with zero or nil data. Various example embodiments may mask different subsets of cells, in order to generate a plurality of masked images that each includes a different subset of cells. Further, a control system may instruct or command masking of a subset of cells to create a masked image by the deep feature extraction and training tool.

The process 500 may then continue with running a model on the masked image, as at 512. For example, a same deep learning model that processed the imaging data of the original image may receive and process the imaging data of the masked image. The deep learning model may process, analyze, detect, identify, classify, and/or recognize one or more objects within the imaging data, as well as one or more characteristics or attributes associated with the objects. Further, a control system may instruct or command processing of the imaging data of the masked image by the deep learning model.

The process 500 may proceed with receiving a masked output from the model based on the masked image, as at 514. For example, after processing the imaging data, the deep learning model may generate one or more possible outputs based on the imaging data of the masked image. In various example embodiments, the possible outputs may comprise the same two or more determinations, decisions, or outputs based on representations of one or more objects within the imaging data of the masked image as the possible outputs based on the original image. Further, a control system may receive the masked output based on the imaging data of the masked image.

The process 500 may continue by determining whether to mask another subset of cells to create another masked image, as at 516. For example, as described herein, various example embodiments may mask different subsets of cells, in order to generate a plurality of masked images that each includes a different subset of cells. In addition, the plurality of masked images may be generated such that each cell is included in a same number of masked images as every other cell of the plurality of cells. Further, a control system may instruct or command determination of whether to mask another subset of cells to create another masked image by the deep feature extraction and training tool.

If it is determined to mask another subset of cells, the process 500 may return to step 510 to mask another subset of cells to create another masked image, and the process 500 may repeat as described.

If, however, it is determined not to mask another subset of cells, then the process 500 may proceed by aggregating all masked outputs and associated masked images, as at 518. For example, a plurality of masked outputs associated with the plurality of masked images may be aggregated in a matrix, table, or other datastore for each cell of the plurality of cells. In various example embodiments, the aggregation or tabulation of the plurality of masked outputs may comprise counts, values, or entries in a matrix, table, or datastore for each cell. In addition, each cell may include a same, total number of entries as every other cell, to facilitate a substantially even or equal comparison between masked outputs for each cell. Further, a control system may instruct or command aggregation of all masked outputs for each of the plurality of cells.

The process 500 may then continue to calculate a number of times each cell is included in masked outputs that match the original output, as at 520. For example, based on the aggregated masked outputs for each cell, a number of such masked outputs that match or correspond to the original output based on the original image may be calculated or determined. As described herein, individual cells of the plurality of cells having a higher number of masked outputs that match or correspond to the original output may be more important or influential with respect to generating, by the deep learning model, the original output based on the original image. Conversely, individual cells of the plurality of cells having a lower number of masked outputs that match or correspond to the original output may be less important or influential with respect to generating, by the deep learning model, the original output based on the original image.

Accordingly, those cells having a higher number of masked outputs that match or correspond to the original output may constitute or correspond to one or more deep features utilized by the deep learning model to generate determinations or decisions. In addition, image regions that correspond to the cells having a higher number of masked outputs that match or correspond to the original output may constitute or correspond to the one or more deep features utilized by the deep learning model. Further, a control system instruct or command calculation of the number of times each cell is included in masked outputs that match the original output.

The process 500 may then proceed to generate a heatmap of cells based on the calculated values of masked outputs that match the original output, as at 522. For example, based on the calculated values of masked outputs that match or correspond to the original output, a heatmap may be generated to visualize individual cells and associated image regions that may constitute deep features utilized by the deep learning model. In example embodiments, the heatmap may be generated based on a count, summation, or aggregation of the number of times that various masked outputs for each cell match or correspond to the original output. In other example embodiments, the heatmap may be generated using various proportions, percentages, fractions, averages, or other mathematic or arithmetic functions based on the various masked outputs for each cell relative to the original output. Further, a control system may instruct or command generation of the heatmap to visualize cells and associated image regions that correspond to deep features utilized by the deep learning model.

The process 500 may then end, as at 524.

Figure 6:
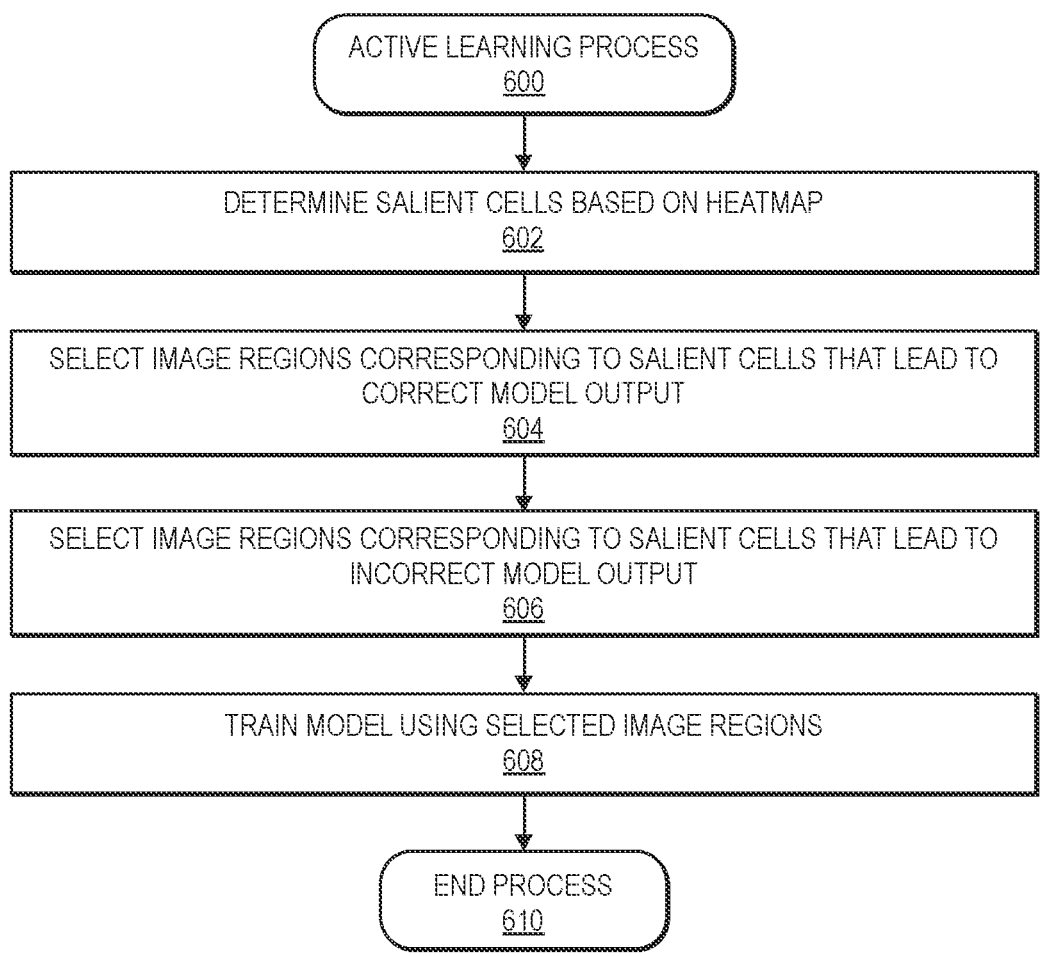
FIG. 6 is a flow diagram illustrating an example active learning process, in accordance with implementations of the present disclosure.

FIG. 6 is a flow diagram illustrating an example active learning process 600, in accordance with implementations of the present disclosure.

The process 600 may begin by determining salient cells based on a heatmap, as at 602. For example, based on the aggregation of masked outputs, based on calculated values of masked outputs that match or correspond to the original output, and/or based on a heatmap of cells based on the calculated values of masked outputs that match or correspond to the original output, one or more salient cells may be determined. The salient cells may comprise those cells having a higher number of masked outputs that match or correspond to the original output. As a result, the salient cells may be more important or influential with respect to generating, by the deep learning model, the original output based on the original image, such that the salient cells may constitute or correspond to one or more deep features utilized by a deep learning model. Further, a control system may instruct or command the determination of salient cells based on the aggregation of masked outputs.

The process 600 may continue by selecting image regions corresponding to salient cells that lead to correct model output, as at 604. For example, image regions that correspond to one or more salient cells may be selected, and such image regions may correspond to deep features that may lead to a correct model output, e.g., a correct determination or decision with respect to imaging data of the original image. Further, a control system may instruct or command selection of image regions corresponding to salient cells.

The process 600 may proceed by selecting image regions corresponding to salient cells that lead to incorrect model output, as at 606. For example, image regions that correspond to one or more salient cells may be selected, and such image regions may correspond to deep features that may lead to an incorrect model output, e.g., an incorrect determination or decision with respect to imaging data of the original image. Further, a control system may instruct or command selection of image regions corresponding to salient cells.

The process 600 may continue to train the model using the selected image regions, as at 608. For example, the selected image regions that correspond to deep features that lead to a correct model output may be used to reinforce, train, or modify the deep learning model, e.g., to emphasize or continue utilizing such deep features. In addition, the selected image regions that correspond to deep features that lead to an incorrect model output may be used to retrain or modify the deep learning model, e.g., to ignore or stop utilizing such deep features. Further, a control system may instruct training of the deep learning model using the selected image regions.

The process 600 may then end, as at 610.

Figure 7:
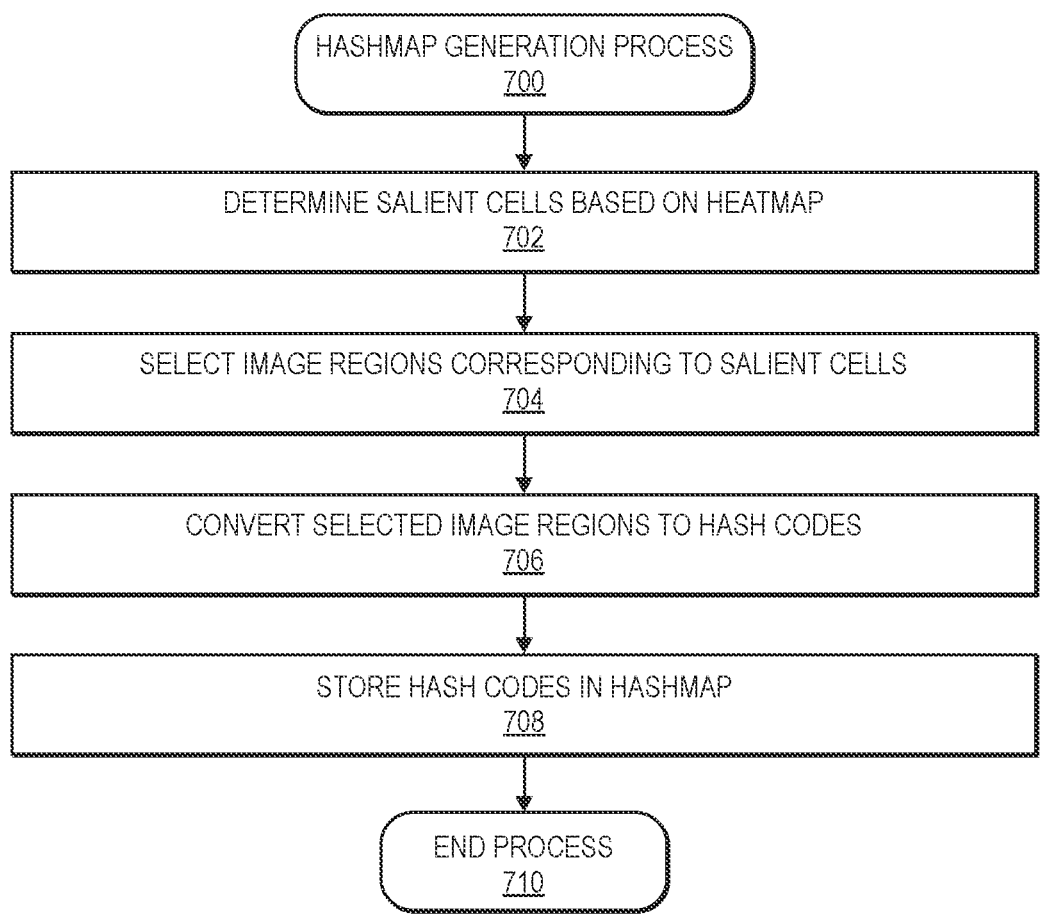
FIG. 7 is a flow diagram illustrating an example hashmap generation process, in accordance with implementations of the present disclosure.

FIG. 7 is a flow diagram illustrating an example hashmap generation process 700, in accordance with implementations of the present disclosure.

The process 700 may begin by determining salient cells based on a heatmap, as at 702. For example, based on the aggregation of masked outputs, based on calculated values of masked outputs that match or correspond to the original output, and/or based on a heatmap of cells based on the calculated values of masked outputs that match or correspond to the original output, one or more salient cells may be determined. The salient cells may comprise those cells having a higher number of masked outputs that match or correspond to the original output. As a result, the salient cells may be more important or influential with respect to generating, by the deep learning model, the original output based on the original image, such that the salient cells may constitute or correspond to one or more deep features utilized by a deep learning model. Further, a control system may instruct or command the determination of salient cells based on the aggregation of masked outputs.

The process 700 may continue by selecting image regions corresponding to salient cells, as at 704. For example, image regions that correspond to one or more salient cells may be selected, and such image regions may correspond to deep features that may lead to a correct model output, e.g., a correct determination or decision with respect to imaging data of the original image, or deep features that may lead to an incorrect model output, e.g., an incorrect determination or decision with respect to imaging data of the original image. Further, a control system may instruct or command selection of image regions corresponding to salient cells.

The process 700 may proceed by converting the selected image regions to hash codes, as at 706. For example, the selected image regions may be converted to hash codes, hash keys, or similar data abstractions associated with deep learning models. For example, hash codes of salient image regions that correspond to deep features that lead to correct decisions, as well as hash codes of salient image regions that correspond to deep features that lead to incorrect decisions, may be generated based on the imaging data of the selected image regions. Various hash functions or algorithms may be utilized to generate the hash codes based on the imaging data of selected image regions. Further, a control system may instruct or command conversion of selected image regions to hash codes.

The process 700 may continue to store the hash codes in a hashmap, as at 708. For example, the generated hash codes may be stored in hashmap, hash table, matrix, table, or other datastore with other related hash codes for associated deep learning models. Some of the stored hash codes may be associated with deep features that lead to correct decisions, and others of the stored hash codes may be associated with deep features that lead to incorrect decisions. In addition, hash codes may be stored in hashmaps that are associated with particular types, instances, or implementations of deep learning models. Further, a control system may instruct or command storage of the hash codes in a hashmap.

The process 700 may then end, as at 710.

Figure 8:
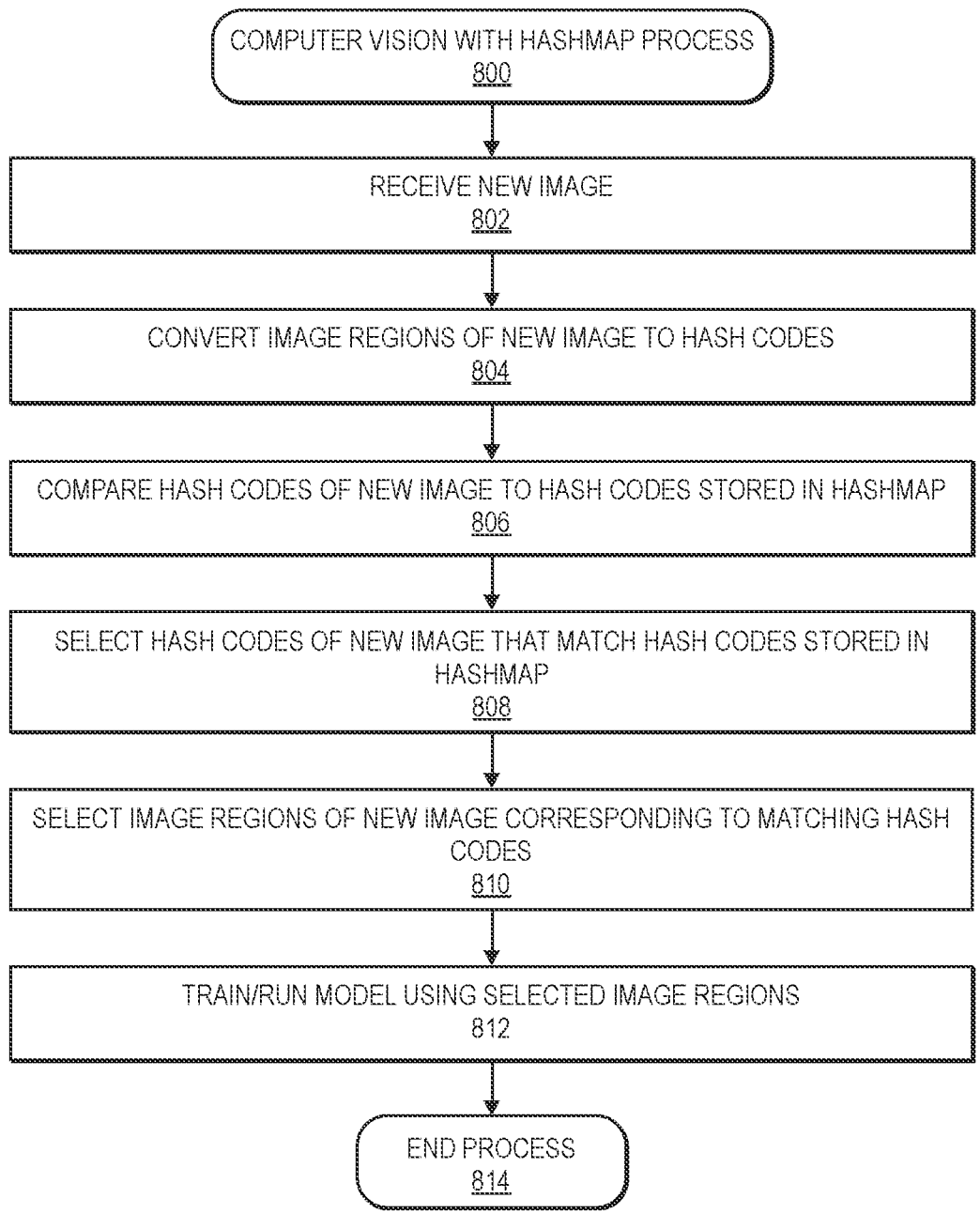
FIG. 8 is a flow diagram illustrating an example computer vision with hashmap process, in accordance with implementations of the present disclosure.

FIG. 8 is a flow diagram illustrating an example computer vision with hashmap process 800, in accordance with implementations of the present disclosure.

The process 800 may begin by receiving a new image, as at 802. For example, a camera, imaging device, or imaging sensor may capture imaging data of a new image. In various example embodiments, the imaging data may include representations of one or more objects, items, packages, envelopes, vehicles, people, clothing, buildings, signs, locations, portions of an environment, or various other types of objects in various types of applications and/or environments. Further, a control system may receive the imaging data of the new image.

The process 800 may continue by converting image regions of the new image to hash codes, as at 804. For example, the imaging data of the new image may be divided into a plurality of image regions. Then, the plurality of image regions may be converted to hash codes, hash keys, or similar data abstractions, which may be stored in a hashmap, hash table, matrix, table, or other datastore with other related hash codes associated with the new image. Various hash functions or algorithms may be utilized to generate the hash codes based on the imaging data of selected image regions. In particular, a same hash function or algorithm may be used to generate the hash codes associated with the new image as a hash function or algorithm that was used to generate stored hash codes against which those of the new image are to be compared. Further, a control system may instruct or command conversion of the plurality of image regions to hash codes.

The process 800 may proceed by comparing hash codes of the new image to hash codes stored in a hashmap, as at 806. For example, the hash codes of the new image may be compared to hash codes stored in the hashmap in order to identify one or more hash codes of the new image that match or correspond to the stored hash codes. Various thresholds related to similarity may be used to determine matching or corresponding hash codes. Further, a control system may instruct or command comparison of hash codes.

The process 800 may continue to select hash codes of the new image that match hash codes stored in the hashmap, as at 808. For example, the hash codes of the new image that match or correspond to stored hash codes based on one or more similarity thresholds may be selected. Such matching hash codes may comprise hash codes that are associated with deep features that lead to correct decisions, and/or hash codes that are associated with deep features that lead to incorrect decisions. Further, a control system may instruct or command selection of matching hash codes.

The process 800 may then proceed to select image regions of the new image corresponding to matching hash codes, as at 810. For example, based on the selected matching hash codes, image regions of the new image that correspond to the selected hash codes may be selected. Such image regions may comprise portions of the imaging data, including representations of one or more objects, that are associated with deep features that lead to correct decisions, and/or that are associated with deep features that lead to incorrect decisions. In this manner, image regions that are associated with deep features may be identified. Further, a control system may instruct or command selection of image regions based on matching hash codes.

The process 800 may continue by training or running a model using the selected image regions, as at 812. For example, the image regions selected based on matching hash codes may be provided as input to a deep learning model, for processing and/or training. In addition, other image regions that have not been selected because they do not correspond to matching hash codes may not be provided as input to the deep learning model. As a result, during training, only image regions that may correspond to identified deep features may be provided to the deep learning model to train, refine, or modify the deep learning model, e.g., in order to train models with a particular focus or emphasis. Furthermore, during processing, only image regions that may correspond to identified deep features may be provided to the deep learning model, in order to reduce the processing and computational load associated with such deep learning models, while still generating accurate and reliable determinations or decisions. Further, a control system may instruct or command training or processing of deep learning models using selected image regions.

The process 800 may then end, as at 814.

Figure 9:
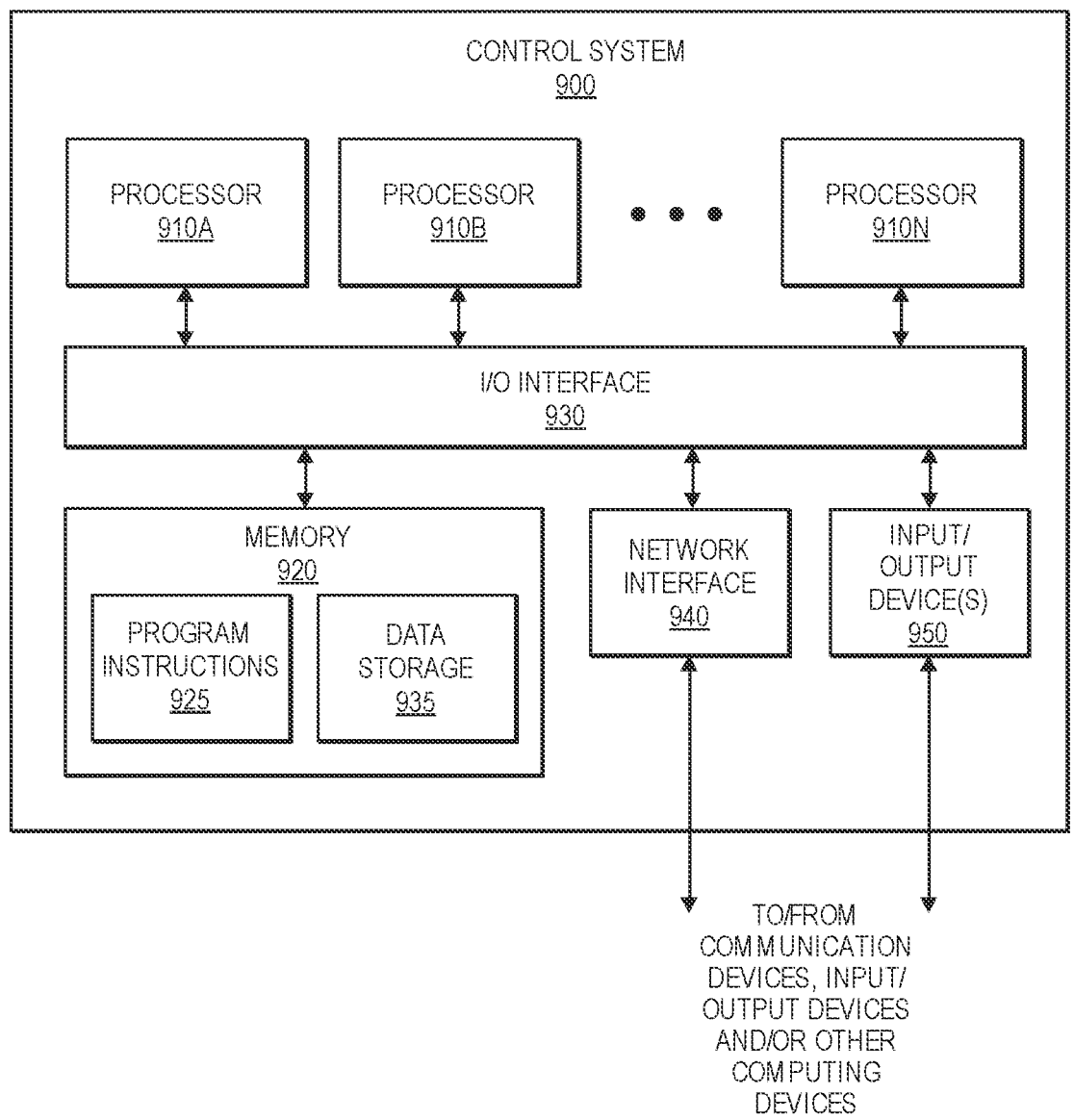
FIG. 9 is a block diagram illustrating various components of an example control system, in accordance with implementations of the present disclosure.

FIG. 9 is a block diagram illustrating various components of an example control system 900, in accordance with implementations of the present disclosure.

Various operations of a control system or controller, such as those described herein, may be executed on one or more computer systems, and/or interacting with various other computers, systems, or devices in various applications and/or environments, according to various implementations. For example, the control system or controller discussed above may function and operate on one or more computer systems. One such control system is illustrated by the block diagram in FIG. 9. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of deep feature extraction and training tools, systems, operations, or processes, etc.) may be implemented via one or more nodes of the control system 900 that are distinct from those nodes implementing other data sources or services (e.g., related to other portions of deep feature extraction and training tools, systems, operations, or processes, etc.).

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other control systems, other computer systems, computer vision systems, deep learning models, algorithms, or neural networks, other machine learning systems, models, algorithms, or networks, material handling system controllers, warehouse management systems, various types of sensors, various types of vision systems, imaging devices, or imaging sensors, or between nodes of the control system 900. In various implementations, the network interface 940 may support communication via wired or wireless general data networks, such as any suitable type of Ethernet network.

Input/output devices 950 may, in some implementations, include one or more visual input/output devices, displays, screens, monitors, projection devices, audio input/output devices, microphones, speakers, keyboards, keypads, touchpads, scanning devices, imaging devices, sensors, photo eyes, proximity sensors, RFID readers, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate deep feature extraction and training tools, operations, and processes described herein, including active learning and model training processes, model selection processes, hashmap generation processes, computer vision using hashmaps processes, as well as sensor controllers, drivers, or applications, sensor data processing applications, vision system or imaging device controllers, drivers, or applications, imaging data processing applications, deep learning models, algorithms, or neural networks controllers, drivers, or applications, etc. The data storage 935 may include various data stores for maintaining data related to deep feature extraction and training tools, systems, operations, or processes described herein, such as imaging data, item or object representations, item or object characteristics or attributes, imaging data tessellation, tessellated cells, masked imaging data, deep learning models, algorithms, or neural networks, deep learning model outputs, aggregated outputs, deep features, salient cells, image regions, heatmaps, hash codes, hashmaps, etc.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-8, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method to extract deep features, comprising:
providing, to a deep learning model, an original image as an input;
receiving, from the deep learning model, an original output associated with the original image;
tessellating the original image into a plurality of cells;
masking a plurality of subsets of the plurality of cells to generate a plurality of masked images, wherein masking the plurality of subsets of the plurality of cells further comprises removing imaging data from at least one cell of the plurality of cells;
for each masked image of the plurality of masked images:

providing, to the deep learning model, the masked image as an input;
receiving, from the deep learning model, a masked output associated with the masked image;
for each cell of the plurality of cells:
aggregating a plurality of masked outputs associated with a respective plurality of masked images that include the cell;
calculating a number of times the plurality of masked outputs that include the cell match the original output; and
generating a heatmap of the plurality of cells based on the number of times that the plurality of masked outputs for each cell match the original output.

2. The method of claim 1, wherein the original output comprises a respective decision of a plurality of decisions related to the original image; and
wherein each masked output comprises a respective decision of the plurality of decisions related to the original image.

3. The method of claim 1, further comprising:
determining a deep feature associated with the deep learning model based on the heatmap of the plurality of cells.

4. A method, comprising:
tessellating an original image into a plurality of cells;
masking a plurality of subsets of the plurality of cells to generate a plurality of masked images, wherein masking the plurality of subsets of the plurality of cells further comprises at least one of removing imaging data from at least one cell of the plurality of cells, replacing imaging data of at least one cell of the plurality of cells with zero or nil data, or deleting at least one cell of the plurality of cells;
for each masked image of the plurality of masked images, receiving, from a deep learning model, a masked output associated with the masked image;
for each cell of the plurality of cells, aggregating a plurality of masked outputs associated with a respective plurality of masked images that include the cell; and
extracting at least one deep feature associated with the deep learning model based on the aggregation of the plurality of masked outputs for each cell of the plurality of cells.

5. The method of claim 4, wherein the original image is tessellated into a grid including the plurality of cells; and
wherein the plurality of cells comprise at least one of squares, rectangles, circles, triangles, pentagons, or hexagons.

6. The method of claim 4, wherein each masked image comprises a respective subset of cells that is different from other masked images.

7. The method of claim 4, further comprising:
for each masked output associated with a respective masked image of the plurality of masked images, associating the masked output with each cell of a respective subset of cells associated with the respective masked image.

8. The method of claim 4, wherein for each cell of the plurality of cells, aggregating the plurality of masked outputs further comprises:
for each cell of the plurality of cells, determining a number of times that the plurality of masked outputs that include the cell correspond to an original output from the deep learning model based on the original image.

9. The method of claim 8, wherein extracting the at least one deep feature further comprises:
extracting the at least one deep feature associated with the deep learning model based on the number of times that the plurality of masked outputs for each cell of the plurality of cells correspond to the original output.

10. The method of claim 8, further comprising:
generating a heatmap of the plurality of cells based on the number of times that the plurality of masked outputs for each cell correspond to the original output;
wherein the heatmap is generated based on summations of the number of times that the plurality of masked outputs for each cell correspond to the original output.

11. The method of claim 4, further comprising:
identifying at least one cell of the plurality of cells that is associated with the at least one deep feature;
determining at least one image region of the original image that corresponds to the at least one cell; and
selecting the at least one image region for processing by an annotation service.

12. The method of claim 4, further comprising:
modifying training of the deep learning model based at least in part on the at least one deep feature;
wherein for an original output that is a correct decision from the deep learning model based on the original image, modifying training comprises reinforcing use of the at least one deep feature by the deep learning model; and
wherein for an original output that is an incorrect decision from the deep learning model based on the original image, modifying training comprises stopping use of the at least one deep feature by the deep learning model.

13. A method, comprising:
tessellating an original image into a plurality of cells;
masking a plurality of subsets of the plurality of cells to generate a plurality of masked images, wherein masking the plurality of subsets of the plurality of cells further comprises at least one of removing imaging data from at least one cell of the plurality of cells, replacing imaging data of at least one cell of the plurality of cells with zero or nil data, or deleting at least one cell of the plurality of cells;
for each masked image of the plurality of masked images, receiving, from a deep learning model, a masked output associated with the masked image;
for each cell of the plurality of cells, aggregating a plurality of masked outputs associated with a respective plurality of masked images including the cell that correspond to an original output from the deep learning model based on the original image; and
extracting at least one deep feature associated with the deep learning model based on the aggregation of the plurality of masked outputs for each cell of the plurality of cells that correspond to the original output.

14. The method of claim 13, further comprising:
selecting the deep learning model, from a plurality of deep learning models, to process a second image based at least in part on the at least one deep feature.

15. The method of claim 13, further comprising:
instructing modification of an object or a portion of an environment represented within the original image based at least in part on the at least one deep feature.

16. The method of claim 13, further comprising:
comparing the at least one deep feature with a second deep feature associated with the deep learning model at a second time; and determining at least one change to the deep learning model based on the comparison of the at least one deep feature and the second deep feature.

17. The method of claim 13, further comprising:

identifying at least one cell of the plurality of cells that is associated with the at least one deep feature;

determining at least one image region of the original image that corresponds to the at least one cell;

generating at least one hash code based on the at least one image region; and storing the at least one hash code in a hashmap.

18. The method of claim 17, further comprising:

receiving a second image;

dividing the second image into a plurality of image regions;

generating a plurality of hash codes corresponding to the plurality of image regions;

comparing the plurality of hash codes associated with the second image with the at least one hash code stored in the hashmap;

selecting at least one of the plurality of image regions of the second image based on the comparison between the plurality of hash codes associated with the second image with the at least one hash code stored in the hashmap; and providing, to the deep learning model, the selected at least one of the plurality of image regions of the second image as an input.

* * * * *